(12) United States Patent
Suntinger et al.

(10) Patent No.: US 10,853,746 B2
(45) Date of Patent: Dec. 1, 2020

(54) SYSTEMS AND METHODS FOR SCHEDULING WORK ITEMS

(71) Applicant: ATLASSIAN PTY LTD, Sydney (AU)

(72) Inventors: Martin Suntinger, Sydney (AU); Martin Sturm, Sydney (AU); Hannes Obweger, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 292 days.

(21) Appl. No.: 14/712,169

(22) Filed: May 14, 2015

(65) Prior Publication Data
US 2016/0335582 A1   Nov. 17, 2016

(51) Int. Cl.
*G06Q 10/06* (2012.01)

(52) U.S. Cl.
CPC .......................... *G06Q 10/063112* (2013.01)

(58) Field of Classification Search
None
See application file for complete search history.

(56) References Cited

U.S. PATENT DOCUMENTS

| | | | |
|---|---|---|---|
| 5,623,404 A | 4/1997 | Colins et al. | |
| 6,886,164 B2 | 4/2005 | Meiri | |
| 8,315,370 B2 | 11/2012 | McCord | |
| 8,332,251 B1 * | 12/2012 | Morris | G06Q 10/06 705/7.22 |
| 8,756,171 B2 | 6/2014 | Lakshmanan et al. | |
| 2003/0018508 A1 | 1/2003 | Schwanke | |
| 2004/0267591 A1 | 12/2004 | Hedlund et al. | |
| 2005/0055179 A1 | 3/2005 | Matheson et al. | |
| 2005/0114829 A1 | 5/2005 | Robin et al. | |
| 2007/0168918 A1* | 7/2007 | Metherall | G06Q 10/06 717/101 |
| 2007/0233969 A1 | 10/2007 | Shukla et al. | |
| 2009/0323921 A1 | 12/2009 | Spottiswoode et al. | |

(Continued)

FOREIGN PATENT DOCUMENTS

WO    WO 0118683 A2    3/2001

OTHER PUBLICATIONS

U.S. Appl. No. 14/712,309, filed May 14, 2015, Office Aciton, dated Jul. 2, 2015.

(Continued)

*Primary Examiner* — Eric W Stamber
*Assistant Examiner* — Ashley Y Young
(74) *Attorney, Agent, or Firm* — Hickman Palermo Becker Bingham LLP

(57) ABSTRACT

Disclosed herein is a computer implemented scheduling method. The method comprises processing project data to determine one or more team-specific scheduling solutions for work items, each team specific scheduling solution for the work item defining a particular team and one or more iterations of that particular team in which the work item can be completed; identifying from the one or more team-specific scheduling solutions an optimal scheduling solution for the work item, the optimal scheduling solution being selected based at least in part on the number of iterations defined by each of the one or more team-specific scheduling solutions; and scheduling the work item according to the optimal scheduling solution identified for the work item.

26 Claims, 10 Drawing Sheets

(56) References Cited

U.S. PATENT DOCUMENTS

| | | | |
|---|---|---|---|
| 2010/0115523 A1* | 5/2010 | Kuschel | G06Q 10/06 718/103 |
| 2011/0125698 A1 | 5/2011 | Rome et al. | |
| 2012/0215574 A1 | 8/2012 | Driessnack et al. | |
| 2012/0215578 A1 | 8/2012 | Swierz et al. | |
| 2013/0263150 A1 | 10/2013 | Bagheri et al. | |
| 2014/0032255 A1 | 1/2014 | Hegazi | |
| 2014/0229212 A1 | 8/2014 | MacElheron et al. | |
| 2014/0249882 A1 | 9/2014 | Li | |
| 2014/0278657 A1 | 9/2014 | Horvitz | |
| 2016/0335575 A1 | 11/2016 | Stuntinger et al. | |
| 2016/0335583 A1 | 11/2016 | Suntinger et al. | |

OTHER PUBLICATIONS

U.S. Appl. No. 14/712,237, filed May 14, 2015, Office Action, dated Jun. 25, 2015.
U.S. Appl. No. 14/712,309, filed May 14, 2015, Office Action, dated Nov. 18, 2016.
U.S. Appl. No. 14/712,237, filed May 14, 2015, Final Office Action, dated Nov. 17, 2015.
Han et al., "Data Mining: Concepts and Techniques", Burlington: Elsevier Science, dated 2011, 42 pages.
Suntinger, U.S. Appl. No. 14/712,309, filed May 14, 2015, Notice of Allowance, dated Jun. 6, 2017.
Suntinger, U.S. Appl. No. 14/712,237, filed May 14, 2015, Final Office Action, dated Jul. 11, 2017.

* cited by examiner

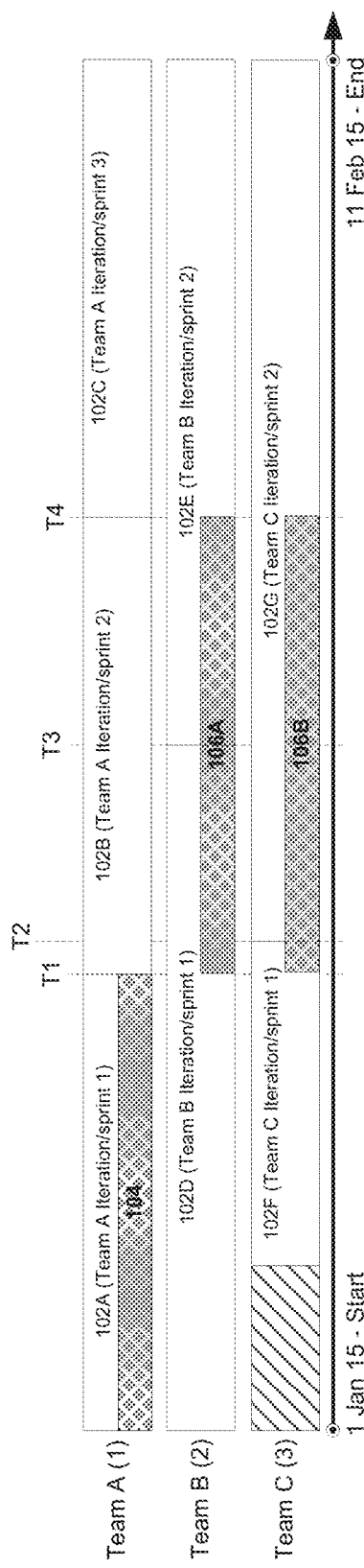
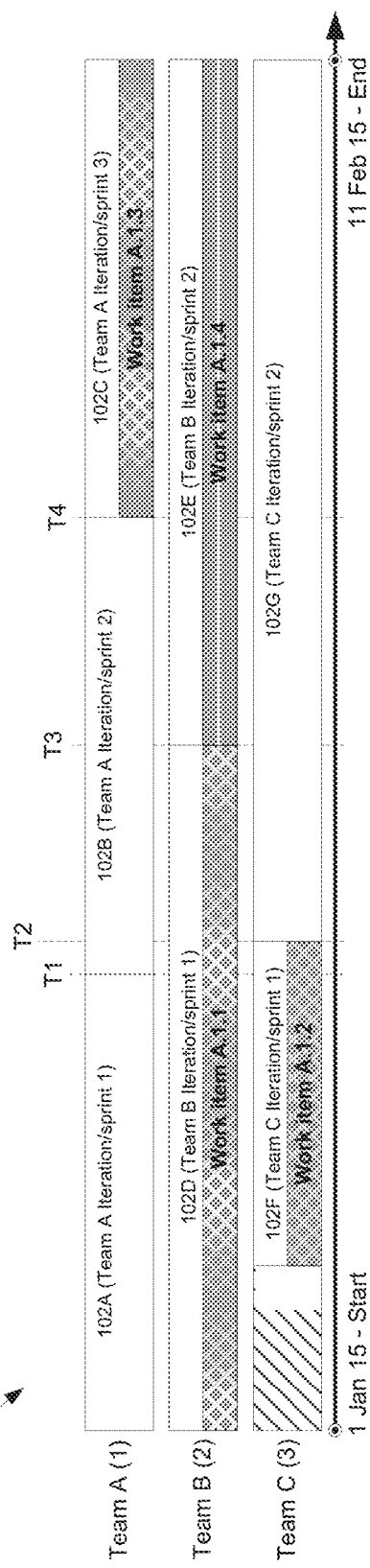
Figure 1
Figure 3

SYSTEMS AND METHODS FOR SCHEDULING WORK ITEMS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © 2014-2015 Atlassian Pty Ltd.

FIELD OF THE DISCLOSURE

The present disclosure generally relates to systems and methods for scheduling work items that form part of a project.

BACKGROUND

The approaches described in this section are approaches that are known to the inventors and could be pursued. They are not necessarily approaches that have been pursued. Therefore, unless otherwise indicated, it should not be assumed that any of the approaches described in this section qualify as prior art merely by virtue of their inclusion in this section, or that those approaches are known to a person of ordinary skill in the art.

Various project planning systems and applications exist. Generally speaking, a purpose of project planning systems is to determine realistic delivery dates of individual work items that make up a project and to coordinate execution/delivery of those work items towards larger projects.

A large number of constraints can influence the scheduling of work items and, ultimately, whether any determined schedule is viable. By way of example, constraints can include the available resources (human or otherwise), the capacity of those resources over time, the skills or capabilities of the resources, interdependencies between work items, and task/project deadlines.

The various competing constraints make determining an appropriate schedule for work items a complex task.

SUMMARY

The appended claims may serve as a summary of the invention.

BRIEF DESCRIPTION OF THE DRAWINGS

In the drawings:

FIG. 1 is a timeline showing iterations (e.g. sprints) of different teams;

FIG. 3 is a timeline illustrating a schedule of work items.

DETAILED DESCRIPTION

Figure 2:
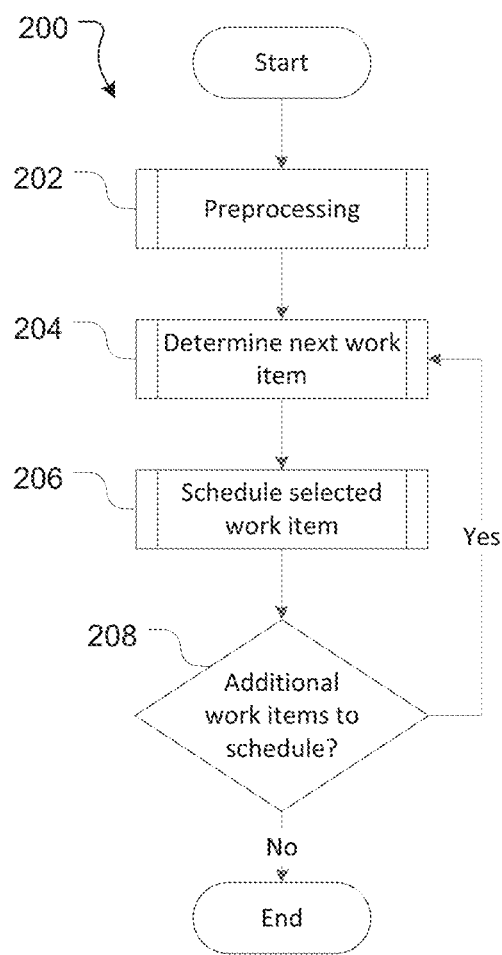
FIG. 2 is a flowchart illustrating high level stages involved in an iteration aware work item scheduling process.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessary obscuring.

The present disclosure generally relates to systems and computer implemented methods for automatically planning or scheduling work items, or for assisting in the planning or scheduling of work items. In order to illustrate various features, project planning in a software development context—and in particular using agile methodologies—wil be described. The features described herein can, however, be used/adapted to plan (or assist in the planning of) other types of projects and projects which employ alternative methodologies.

The disclosure is set out in the following sections:
1. General overview of software development considerations.
2. Iteration aware scheduling.
   2.1. Iteration aware scheduling problem description.
   2.2. Computer implemented method for iteration aware scheduling.
   2.3. Iteration aware scheduling clauses.
3. Automatic assignment of work items to team resources.
   3.1. Computer implemented method for automatically assigning work items to team resources.
   3.2. Automatic assignment of work items to team resources clauses.
4. Release aware scheduling.
   4.1. Release aware scheduling problem description.
   4.2. Computer implemented method for release aware scheduling.
   4.3. Resource aware scheduling clauses.
5. System architecture suitable for implementing/providing one or more of the features described herein.
6. Hardware suitable for implementing/providing one or more features described herein.

1. Overview of Software Development Considerations

Historically, software development was undertaken using a traditional engineering project approach. This approach involves a sequential development process (e.g. the waterfall model) which divides the development into distinct stages: requirements analysis, design, implementation, testing, integration, deployment, maintenance. In a sequential development process the output of one development phase is effectively the input to the next development phase.

While the waterfall model may still be used for some projects, current software (and potentially other) development projects often employ other, more flexible, development methodologies. Agile development is one such group of methodologies, specific examples of which include scrum, kanban, scrum ban, and other known agile methodologies. Teams working within agile methodologies have particular requirements and needs when it comes to scheduling/planning work that is to be performed across defined time frames and by multiple teams working in parallel. These needs and requirements differ from those that accompany traditional project management methodologies.

As one agile example, in a scrum methodology the available human resources work in teams, and each team works in defined length iterations (often referred to as sprints). Ideally, each iteration has a defined set of work associated with it, the goal of a given iteration being to complete that set of work and deliver a working and potentially shippable product increment. Larger projects are usually delivered in small increments in order to get early feedback and, if necessary, to allow early adjustment to be undertaken rather than only evaluating at the very end of a project.

Iteration durations are typically short, for example 1 to 4 weeks, though can be shorter/longer. A common iteration duration is 2 weeks. A given team can have iterations of different durations, different teams can have iterations of different durations compared to one another, and/or the iterations of the teams may start at different times. This is illustrated in FIG. 1. In the time period represented by FIG. 1, team A is shown to have three iterations 102A-102C which each have the same duration. Team B has two iterations 102D-102E, each of which are the same duration, but a different duration to the iterations of team A. Due to this different duration, the start time of team B's iteration 102E does not align with the start time of any of team A iterations (falling in the middle of team A iteration 102B). Team C has two complete iterations 102F and 102G which have different durations.

The iterations of the teams cause problems with existing scheduling systems and methodologies. By way of illustration, consider a work item 104 that is assigned to team A. Work item 106 is dependent on work item 104 (i.e. work item 106 cannot be commenced until work item 104 is complete) and due to skill/capability requirements must be completed by team B or Team C. Based on these requirements, work item 106 has an earliest start date of T1 (i.e. the end of team A iteration 1 and anticipated completion date of work item 104). Under existing scheduling systems work item 106 would be scheduled to commence as early as possible—at T1. By assigning work item 106 to team B to start at T1 (see 106A) or to team C to start at T1 (see 106B), however, the work item would not start at the beginning of an iteration and will span across multiple iterations. These consequences are not, generally speaking, desirable. Instead, the work item should be scheduled to start at the start of Team B or Team C's next iteration (T2 or T3). This is despite the fact that T2 and T3 are some days after the earliest possible start of task 106.

In order to account for teams working in iterations (or sprints) when scheduling tasks iteration aware scheduling processes are described in sections 2 and 3 below. The iteration aware scheduling processes generate and make use of an additional time abstraction layer. In addition to a global time axis on which tasks are scheduled, each team is provided with its own additional time axis which is defined by the iterations that team works in (the iterations being non-overlapping time segments). This time axis imposes additional constraints that are considered when scheduling tasks. In addition to allowing the scheduling of work items to be performed within the context of iterations, the time axis/constraints applied have the effect of reducing the solution space of the work item scheduling problem. Rather than generating a schedule on a daily basis teams are scheduled for each iteration.

Further, by taking into account iterations when attempting to schedule work items priority is placed on minimizing the number of iterations that are required in order to complete the work item. This can be contrasted with other task scheduling processes where the end date of a schedule is prioritized.

Section 4 goes on to describe an embodiment in which the iteration aware scheduling processes are extended to take into account releases—i.e. project milestones or other deliverables.

Agile methodologies also enable complexity-based estimation techniques (e.g. story-point based estimation) to be used when planning/scheduling work items. This involves estimating using a relative unit of complexity (e.g. story points). Correspondingly, teams measure/estimate how many complexity units can be achieved by the team members in a given iteration (commonly referred to as the team's velocity). As complexity-based estimates don't have a direct relation to time, work items cannot be scheduled on a time basis within an iteration. Rather, the whole iteration needs to be taken as the unit of planning granularity.

2. Iteration Aware Scheduling

This section describes a scheduling process which takes into account iterations (or sprints) in which teams work when scheduling work items.

2.1 Iteration Aware Scheduling Problem Description

This section provides an overview of various concepts that are relevant to the problem of scheduling work items that make up a project (or multiple projects) across teams available to work on those work items whilst at the same time taking into account iterations in which those teams work.

Workflow and Stages

In agile methodologies the basic work item is the user story. A work item/user story is denoted as p, and the set of all work items that need to be scheduled is denoted $\mathcal{P}$ (p$\in\mathcal{P}$).

In one implementation a work item p can pass through a defined work flow. In this case a work flow is set up for the entire schedule (or roadmap) and consists of a sequence of stages q. The set of all stages of a work flow is denoted Q (q$\in$Q).

Skills s can be defined and, where used, are associated with work items/stages as well as resources. Skills associated a stage indicate the skills required to complete that stage and skills held by/associated with a resource indicate the skills that resource is able to contribute to a stage. In one implementation the set of all skills is denoted S (s$\in$S). Each stage q is associated with a set of one or more skills s required to complete that stage. The set of skills relevant to a particular stage is denoted $S_q$ ($S_q \subseteq S$). The set of skills for a given stage are mutually disjoint such that the stage of a given skill $q_s$ is strictly defined.

The time in which work items can be scheduled by the scheduling method (i.e. how far ahead scheduling method plans) is denoted by the interval [0, $\tilde{T}$], ($\tilde{T} \in \mathbb{N}$). $\tilde{T}$ will be referred to as the planning horizon. Each time step in [0, $\tilde{T}$] represents a planning interval, for example 1 day. Alternative planning intervals could be adopted as appropriate, for example a set number of minutes/hours/day/weeks etc.

Resources and Teams

A resource that is available to work on a work item is denoted r. A resource may be a human resource (e.g. an employee) or a non-human resource (e.g. a piece of equipment, a room etc.). The set of all available resources is denoted $\mathcal{R}$ ($r \in \mathcal{R}$).

For every resource r and skill s a value $\eta_{rs}$ ($\eta_{rs} \in \{0,1\}$) is provided which indicates whether the resource r is proficient in the skill s. With this in mind the skill set of a resource is defined as $S_r$ ($S_r = (s|\eta_{rs}>0)$) and the stage set of a resource is defined as $Q_r$ ($Q_r = \{q|S_q \cap S_r \neq \emptyset\}$).

An iteration availability is also provided for every resource: $R_{rt}$ ($R_{rt} \in \mathbb{R}_0^+$). The iteration availability for a resource is a sum of the daily availabilities of that resource in the iteration. Iteration availability can be computed based on a resource's normal weekly working hours and absences (e.g. holidays) during the iteration in question.

Resources are organized into teams. A team is denoted q and the complete set of teams is denoted $\mathcal{G}$ ($g \in \mathcal{G}$). For the purposes of the scheduling method a resource is assigned to exactly one team. Accordingly, and by way of example, if a single employee works 20 hours a week time in team A and 20 hours a week in team B the scheduling method will treat this as two separate resources (one a member of team A with 20 hours of availability per week, and one a member of team B with 20 hours of availability per week). The team to which a resource is assigned is denoted $g_r$. The set of resources of a team is denoted $\mathcal{R}_g$. The set of skills available in a team is denoted $S_g$ ($S_g$ being the union of all skills held by all resources assigned to the team).

As noted, in agile methodologies teams partition their time in a sequence of work slots or iterations. An iteration is denoted t, and the set of all a team's iterations is denoted $\mathcal{T}_g$ ($t \in \mathcal{T}_g$). Each iteration is characterized by a start time $ST_t$ and an end time $ET_t$. For a given iteration t, $ST_t < ET_t$ and $ST_t$ and $ET_t$ each fall within (or on the bounds of) the interval $[0, \tilde{T}]$. A given iteration t starts after the preceding iteration ends. Iterations t can be individually defined by a user and/or generated by the system based on defined parameters such as a starting time/date and the normal duration of the team's iterations.

For convenience, the iterations assigned to a given resource ($\mathcal{T}_r$) are the same as the iterations defined for the team that resource is a member of ($\mathcal{T}_g$). The time-step availability of resources $\mathcal{R}_{rt}$ is defined for every iteration as the sum of time-step availabilities in the iteration interval and is therefore also an element of $\mathbb{R}_0^+$.

Work Demand

As noted, the basic work item p in agile methodologies is the user story. The work package of a user story is defined by a number of skill demands denoted by $\mathcal{D}_{ps}$ ($\mathcal{D}_{ps} \in \mathbb{R}^+$). Based on this demand values of the sequence of stages ($Q_p$) of a work item p is defined as the roadmap stage sequence which does not include the stages with no demand for the work item. This can be determined because each skill is assigned to exactly one stage.

Furthermore the work items are ranked in the backlog of work items. This ranking is absolute in the sense that each work item has a higher priority than all its successors together. The ranking of a work item in the backlog defines the value of the work item. Phrased alternatively, the higher priority a work item has the higher its value.

Dependencies between work items are also taken into account. These are modelled as a directed acyclic graph $G^< = (\mathcal{P}, \mathcal{A})$. The set of predecessors $\mathcal{P}_p^<$ of a given work item must be worked off before the given work item can be started.

The earliest start time for a work item can also be defined, and is denoted $EST_p$ ($EST_p \in [0, \tilde{T}]$).

A further constraint is the limitation of the maximum number of resources permitted to work on a given stage of a work item. This is controlled by the parameter L ($L \in \mathbb{N}$), which is used as a limitation.

A further constraint is that a given work item (story) must be implemented by exactly one team.

Iteration Aware Scheduling Problem Description

A mixed integer linear program is provided to solve the problem of scheduling a set of work items $\mathcal{P}$ with the constraints described above. This section provides a formalization of the problem.

For this formalization a given work item/user story p is decomposed into activities denoted a, the set of all activities being denoted $\mathcal{A}$ ($a \in \mathcal{A}$). Each activity a represents a stage of the original work item p. An activity a has associated work demands $\mathcal{D}_{as}$ ($\mathcal{D}_{as} \in \mathbb{R}^+$) that correspond to the values of the stage represented by that activity.

A directed acyclic graph of the set of activities is used: $G^{A<} = (A, \epsilon)$. The set of arcs/edges $\epsilon$ model the linear dependencies of the stages and the prerequisite relations between different work items.

Work Constraints

Initially the set of continuous variables that quantify the amount of work to be done for a given activity by a given resource in one of its iterations using one of its skills is defined. This is shown in definition 1 below. The constraint shown in definition 2 makes sure that resources are not overbooked $$x_{arts} \in \mathbb{R}_0^+ \qquad \text{Definition 1}$$
$$a \in \mathcal{A}, r \in \mathcal{R}, t \in \mathcal{T}_r,$$
$$s \in S_{ar}$$

$$\sum_{a \in \mathcal{A}} \sum_{s \in S_{ar}} x_{arts} \leq \mathcal{R}_{rt} \qquad \text{Definition 2}$$
$$r \in \mathcal{R}, t \in \mathcal{T}_r$$

Work Demand

Work demand is implemented by introducing a set of binary decision variables denoting whether or not a work a work item is scheduled (definition 3 below) and, if the work item is scheduled, enforcing that scheduled activities meet their work requirements (definition 4 below).

$$y_p \in \{0, 1\} \qquad \text{Definition 3}$$
$$p \in \mathcal{P}$$

$$\sum_{r \in \mathcal{R}} \sum_{t \in \mathcal{T}_r} x_{arts} = y_p * \mathcal{D}_{as} \qquad \text{Definition 4}$$
$$a \in \mathcal{A}_p, s \in S_a$$

Resource Assignment

In order to implement the limitation on assigned resources per activity, binary variables are introduced to indicate the fact that a resource is working on an activity (definition 5 below). The constraint shown in definition 6 below couples these variables with the continuous decision variables. The constraint shown in definition 7 then limits the number of assignments based on the maximum resource constraint parameter L (which defines the number of resources that can work on the work item).

$$y_{ar} \in \{0, 1\} \qquad \text{Definition 5}$$
$$a \in \mathcal{A}, r \in \mathcal{R}$$

$$y_{ar} * M \geq \sum_{t \in \mathcal{T}_r} \sum_{s \in \mathcal{S}_r} x_{arts} \qquad \text{Definition 6}$$
$$a \in \mathcal{A}, r \in \mathcal{R}$$
M is a sufficiently large constant (e.g. 10 million).

$$\sum_{r \in \mathcal{R}} y_{ar} \leq L_a \qquad \text{Definition 7}$$
$$a \in \mathcal{A}$$

Team Assignment

A single team assignment is enforced by introducing binary variables for every team (definition 8 below). The constraint shown in definition 9 below couples these variables with the continuous decision variables, and the actual limitation is added in the constraint shown in definition 10.

$$y_{pg} \in \{0, 1\} \qquad \text{Definition 8}$$
$$p \in \mathcal{P}, g \in \mathcal{G}$$

$$y_{pg} * M \geq \sum_{a \in \mathcal{A}} \sum_{r \in \mathcal{R}_g} \sum_{t \in \mathcal{T}_r} \sum_{s \in \mathcal{S}_{ar}} x_{arts} \qquad \text{Definition 9}$$
$$p \in \mathcal{P}, g \in \mathcal{G}$$

$$\sum_{g \in \mathcal{G}} y_{pg} \leq 1 \qquad \text{Definition 10}$$
$$p \in \mathcal{P}$$

Dependencies

To ensure correct handling of the dependency constraint between activities a further set of binary decision variables is defined to indicate that an activity is being executed in a given iteration (definition 11 below). The coupling constraints are given in definition 12. Further, integer variables are introduced to model the start time of an activity $st_\alpha$ (definitions 13 and 14 below) and the end time of an activity $et_\alpha$ (definitions 15 and 16 below). A constraint is also introduced to ensure that the start time of an activity is greater (later) than the end time of its predecessors (definition 17).

$$y_{at} \in \{0, 1\} \qquad \text{Definition 11}$$
$$a \in \mathcal{A}, t \in \mathcal{T}$$

$$y_{at} * M \geq \sum_{r \in \mathcal{R}} \sum_{s \in \mathcal{S}_{ar}} x_{arts} \qquad \text{Definition 12}$$
$$a \in \mathcal{A}, t \in \mathcal{T}$$

$$st_a \in [0, \overline{T}] \qquad \text{Definition 13}$$
$$a \in \mathcal{A}$$

$$st_a \leq y_{at} * ST_t \qquad \text{Definition 14}$$
$$a \in \mathcal{A}, t \in \mathcal{T}$$

$$et_a \in [0, \overline{T}] \qquad \text{Definition 15}$$
$$a \in \mathcal{A}$$

$$et_a \leq y_{at} * ET_t \qquad \text{Definition 16}$$
$$a \in \mathcal{A}, t \in \mathcal{T}$$

$$et_{a_1} + 1 \leq st_{a_2} \qquad \text{Definition 17}$$
$$(a_1, a_2) \in \varepsilon$$

Earliest Start

To implement the earliest start time (EST) constraint the activity start variable already defined for the dependency constraints is used (definition 18 below).

$$st_\alpha \geq EST_\alpha \quad \alpha \in \mathcal{A} \qquad \text{Definition 18}$$

Iteration Aware Scheduling Optimization

A hierarchy of objective functions (in decreasing importance) is defined:
1) Work flow
2) Work item (story) value
3) Weighted completion times Work Flow The topmost priority is to ensure a structured work flow by minimizing the number of iteration violations.

An iteration violation occurs where an additional iteration needs to be used to complete a work item. For example, a work item that can be completed in a single iteration does not have any iteration violations. A work item that requires two iterations has a single iteration violation. A work item that requires three iterations has two iteration violations and so forth.

This priority is provided in definition 19:

$$\min \sum_{a \in \mathcal{A}} \sum_{t \in \mathcal{T}} y_{at} \qquad \text{Definition 19}$$

Work Item (Story) Value

The first objective independent of the presence of strictly scheduled work items (i.e. work items that are strictly assigned to a particular release, as described in further detail below) is to maximize the aggregated value of scheduled work items. Given weight values for work items $W_p$, the objective provided in definition 20 is given:

$$\max \sum_{p \in \mathcal{P}} y_p * W_p \qquad \text{Definition 20}$$

Weighted Completion Times

Solutions where more important work items are completed before less important/minor work items are preferred. Accordingly, the weighted completion time is minimized (see definitions 21, 22, and 23 below):

$$\min \sum_{p \in \mathcal{P}} et_p * W_p \qquad \text{Definition 21}$$

$$et_p \geq et_a \qquad \text{Definition 22}$$
$$p \in \mathcal{P}, a \in \mathcal{A}_p$$

-continued $$et_p \in [0, \overline{T}]$$
$$p \in \mathcal{P}$$

Definition 23

2.2 Iteration Aware Scheduling Method

The optimization problem described above is a mixed integer linear problem (MILP). This may be input into a general purpose solver (e.g. CPLEX) to find the optimal solution.

One issue with this general approach is the potential size of the problem. Users may generate plans with thousands of work items and hundreds of resources spanning over horizons of several years. At the time or this application problems of this size are not practically solvable in any reasonable time frame.

Furthermore, the problem is inherently stochastic. The estimation of complex tasks (as often arise in software engineering) is always difficult. The resources that are being allocated are typically human resources which means that actual availability and performance are not as deterministic as is proposed by the model.

These factors limit the value of an optimal solution significantly.

Approximate solutions can, however, be acceptable to users and be calculated in significantly shorter time frames. Accordingly, in the present embodiment a heuristic implementation is used which is based on search methods/algorithms and problem decomposition. This decreases the time complexity as well as the required computing power/resources.

This section provides a detailed example of a computer implemented method for automatically scheduling project tasks whist taking the iterations in which teams work into account. The method is implemented by a computer processing system, one example of which is described in section 6 below.

As described above data relevant to the task scheduling method include information regarding resources, teams, skills, and work items. This data will be generally referred to as project data. Some project data is defined by users and some project data is calculated/generated by the work item scheduling process discussed below. Project data may be input and/or stored in a various ways. In the present embodiment tables are used.

Table 1 below is an example of a table used to capture/store data relating to resources. In this example each resource record can include: a team identifier identifying the team to which the resource belongs; a resource identifier for identifying the resource (team member) to which the row/record relates; the availability of the resource; planned absences for the resource; weekly hours that the resource spends in the indicated team; the skill(s) of the resource: and the iteration schedule of the team to which the resource belongs.

TABLE 1

| | | | Resources | | | |
|---|---|---|---|---|---|---|
| Team | Resource | Available | Absent | Weekly Hours in Team | Skills | Team Schedule |
| A | Member A | Always | None | 40 | 1 | Scrum (2 weeks) |
| A | Member B | Always | None | 20 | 1, 2 | |
| B | Member C | Always | None | 32 | 3 | Scrum (3 weeks) |
| B | Member D | Always | None | 40 | 1, 2, 3 | |
| B | Member B | Always | None | 20 | 1, 2 | |
| C | Member D | Always | None | 40 | 1, 2, 3 | Scrum (2 weeks), sprints starting on Tuesdays. Extended sprint 2 from 16 Jan. 2015 to 11 Feb. 2015 |
| C | Member E | Always | None | 40 | 3 | |

As can be seen in Table 1, resource B spends 20 hours a week in team A and 20 hours a week in team B. In this case, when calculating task assignments resource B will effectively be considered as two separate resources: one resource being dedicated to team A for 20 hours a week, and one resource being dedicated to team B for 20 hours a week.

Table 2 below is an example of a table used to capture/store data relating to work items. In this example each work item record can include: a work item identifier, identifying the work item; a team identifier which, once calculated, indicates the team to which the work item is assigned; an earliest start date/time which indicates the earliest start date/time for the work item; a depends on field recording work item interdependencies; a scheduled start date/time which (once the schedule has been calculated) indicates when the work item is scheduled to start; a scheduled end date/time which (once the schedule has been calculated) indicates when the work item is scheduled to end; a time estimate (est) indicating the number of time units (e.g. hours) the work item will consume; a required skills field indicating the skills required to complete the work item; a priority rank field indicating the priority of a work item; a project identifier indicating the project which the work item is part of.

TABLE 2

| | | | | Work items | | | | | | | |
|---|---|---|---|---|---|---|---|---|---|---|---|
| Work item | Team | Earliest Start | Depends on | Sched start | Sched end | Est (h) | Skill 1 | Skill 2 | Skill 3 | Priority | Project |
| A | (Calc) | | | (Calc) | (Calc) | 290 | 95 | 45 | 150 | | A |
| A.1 | (Calc) | | | (Calc) | (Calc) | 290 | 95 | 45 | 150 | | A |
| A.1.1 | Team B | | | (Calc) | (Calc) | 100 | | | 100 | 1 | A |
| A.1.2 | Team C | | | (Calc) | (Calc) | 40 | 20 | 20 | | 2 | A |
| A.1.3 | (Calc) | | A1.1 | (Calc) | (Calc) | 50 | 50 | | | 3 | A |
| A.1.4 | (Calc) | 15 Jan. 2015 | | (Calc) | (Calc) | 100 | 25 | 25 | 50 | 4 | A |

Tables such as 1 and 2 above may be presented to a user via an appropriate user interface so that the user can enter relevant data in respect of the project. In some cases, the tables may be entirely or partially pre-populated from already available information. The user can then enter information into the fields provided, the information being stored for use in the task scheduling process. The values that a user does not specify are automatically filled once the scheduling process has been performed and the relevant values have been calculated.

Data may be captured/stored/presented in alternative ways.

FIG. 2 provides a flowchart 200 which depicts the high level stages involved scheduling tasks taking into account iterations in which teams work. Each of the high level stages represented by flowchart 200 will be described in detail following the general description.

At 202 preprocessing is performed to identify and remove work items that cannot be completed and resources that cannot contribute to the task scheduling process.

At 204 the next work item to be scheduled is identified.

At 206, an attempt to schedule the work item selected at 204 is made.

At 208 a check is made to determine whether further work items require scheduling. If so the process returns to 204. If not the scheduling is complete.

Once the scheduling process is complete the schedule calculated is presented to a user. By way of example, the tables described above may be used to present scheduling information to a user by populating the fields calculated by the scheduling method (e.g. populating the Team, members, scheduled start, and scheduled end fields in the work items table). Continuing with the example provided in Tables 1 and 2 above, Table 3 shows the updated work item table following the scheduling process:

TABLE 3

Work items following scheduling process

| Work item | Team | Earliest Start | Depends on | Sched start | Sched end | Est (h) | Skill 1 | Skill 2 | Skill 3 | Priority | Project |
|---|---|---|---|---|---|---|---|---|---|---|---|
| A | A, B, C | | | 1 Jan. 2015 | 11 Feb. 2015 | 290 | 95 | 45 | 150 | | A |
| A.1 | A, B, C | | | 1 Jan. 2015 | 11 Feb. 2015 | 290 | 95 | 45 | 150 | | A |
| A.1.1 | Team B | | | 1 Jan. 2015 | 21 Jan. 2015 | 100 | | | 100 | 1 | A |
| A.1.2 | Team C | | | 6 Jan. 2015 | 15 Jan. 2015 | 40 | 20 | 20 | | 2 | A |
| A.1.3 | A | | A1.1 | 29 Jan. 2015 | 11 Feb. 2015 | 50 | 50 | | | 3 | A |
| A.1.4 | B | 15 Jan. 2015 | | 22 Jan. 2015 | 11 Feb. 2015 | 100 | 25 | 25 | 50 | 4 | A |

A visual timeline may also be generated and presented to a user to illustrate the resulting scheduling. FIG. 3 provides an example of such a timeline 300 depicting the scheduling of work items A.1.1, A.1.2, A.1.3, and A.1.4 of the example above. As can be seen: work item A.1.1 has been scheduled into iteration 1 of Team B; work item A.1.2 has been scheduled into iteration 1 of Team C; work item A.1.3 has been scheduled into iteration 3 of Team A; and work item A.1.4 has been scheduled into iteration 2 of Team B.

Calculated schedule information may also (or alternatively) be communicated to other processes or applications which may use the scheduling information for downstream purposes.

Preprocessing: 202

Preprocessing is performed at 202 in order to prune or simplify the search space of the optimization problem. This assists in reducing the size of the problem space and, accordingly, the processing time and memory usage required to perform task scheduling. Generally speaking this involves removing work items that cannot be scheduled and resources that cannot contribute to the work items from further processing.

Figure 4:
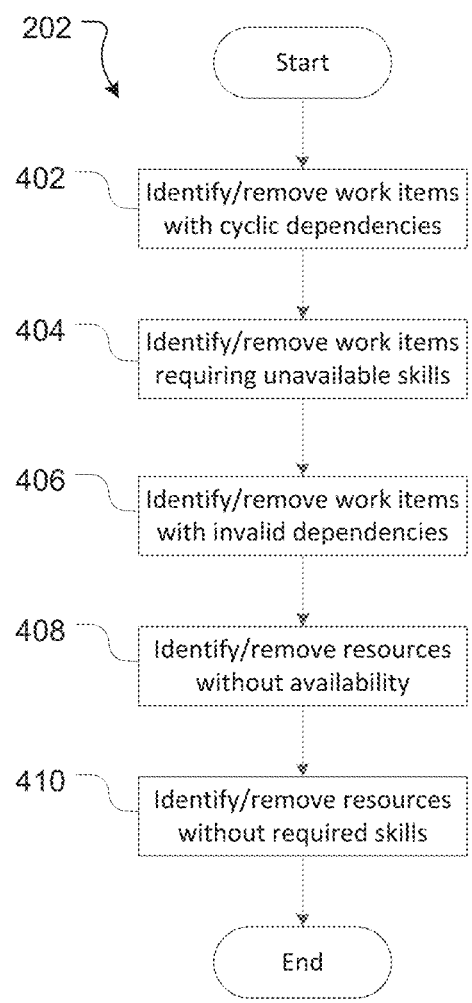
FIG. 4 is a flowchart illustrating preprocessing performed in an iteration aware work item scheduling process.

FIG. 4 provides a flowchart 202 illustrating preprocessing performed in in accordance with one embodiment.

At 402, work items which have circular/cyclic dependencies and, as such, cannot be executed, are identified and removed from further processing. Circular dependencies can be identified by processing the set of work items (including the dependencies between work items) using known cycle detection or topological sorting algorithms.

At 404, work items that require any skill that is not held by any of the available resources are identified and removed from further processing. If a given work item requires a skill that is not held by any resource the work item cannot be completed. In this case the work item removed from the set of work items. Conversely, if all skills required for a given work are available the work item can potentially be completed and it is not removed from the set of work items.

At 406, work items that have invalid dependencies are identified and removed from further processing. At 406 a work item will have an invalid dependency if it is dependent on a work item that has been removed from the set of work items: i.e. if it is dependent on a work item identified at 402 to be circularly dependent or if it is dependent on a work item identified at 404 to require an unavailable skill.

The removal of cyclic dependencies (and work items dependent thereon) ensures that the dependency graph G is an acyclic dependency graph.

Where work items are removed at 402, 404 or 406 an alert is raised to a user via a user interface. In this case the alert may indicate any work items that have been removed together with the reason for their removal: e.g. cyclically dependent, unavailable skills (together with the specific skills that are required and are not available), or dependent on such a work item.

At 408 resources that do not have availability to assist are identified and removed from further processing. This involves checking the availability of each resource $R_{rt}$ against the planning horizon $\tilde{T}$. If a resource r does not have any availability before the planning horizon it is determined to be unavailable and removed from the set of resources $\mathcal{R}$. If the resource does have availability before the planning horizon it is not removed from the set of resources (at least at this stage).

At 410 resources that do not hold any skills required by any of the work items are identified and removed from further processing. This involves processing each resource r by checking the skil set of the resource $S_r$ against the superset of all skills required by all work items p in the set of work items $\mathcal{P}$. If the skill set for a given resource and the superset of skills required for all work items are disjoint, the resource is not needed for any work item and is removed from the set of resources. Conversely, if the skill set of a given resource and the superset of work item skills overlap/intersect the resource can contribute and is not removed from the set of resources.

Determination of Next Work Item to be Processed: 204

In the scheduling process the work items p in the set of work items $\mathcal{P}$ are scheduled in turn. The next work item p to be scheduled is determined at 204.

In one embodiment the order in which the work items are scheduled is determined by processing the backlog of work items (i.e. the work items in the set of work items that have not yet been scheduled) to identify the first or highest priority (defined and stored, for example, in a work item table) work item without an unscheduled predecessor. As the preprocessing described above removes any circular dependencies the work items form one or more directed acyclic graphs and an eligible work item will be available.

In light of this, a variety of techniques can be used to determine the order in which work items are processed, for example linearization/topological sorting algorithms.

Work Item Scheduling: 206

Once a work item p has been identified an attempt is made to schedule that work item at 206. The work item being scheduled will be referred to as the current work item.

Generally speaking, scheduling the current work item involves trying to find a scheduling solution that:
1) minimizes the number of iteration violations; or
2) where multiple solutions yield the same minimum number of iteration violations, minimizes the number of iteration violations and provides an earliest end time.

This involves attempting to find a scheduling solution that falls within a defined time interval.

Figure 5:
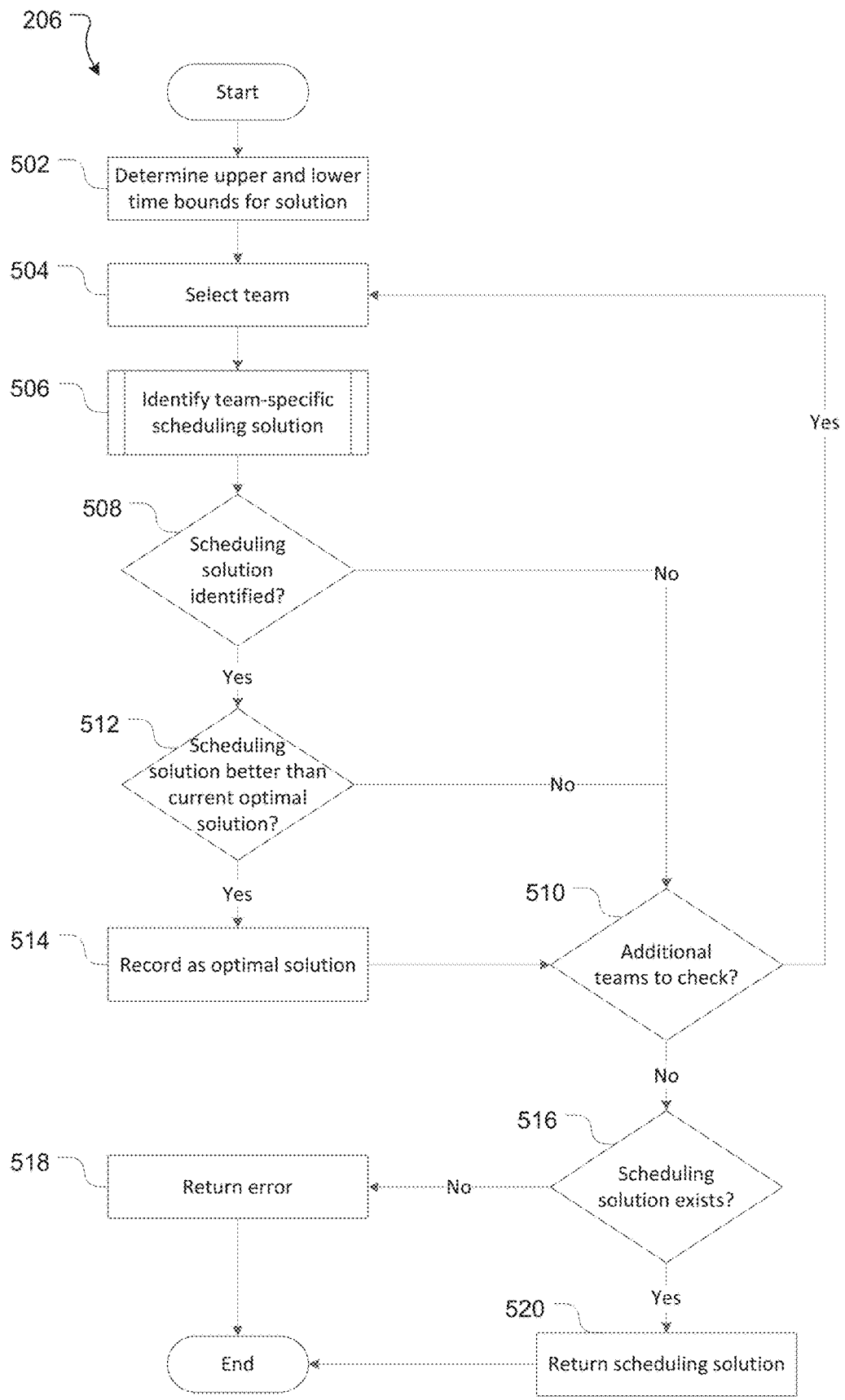
FIG. 5 is a flowchart illustrating a process for scheduling a selected work item.

FIG. 5 provides a flowchart 206 illustrating the process of scheduling a work item identified in 204 in accordance with one embodiment.

At 502 the lower and upper time bounds for the defined time interval are initially determined.

The lower time bound does not change over the course of process 206, however the upper time bound can change as more optimal scheduling solutions (i.e. scheduling solutions that result in the current task having an earlier end time) are identified.

The lower bound of the time interval is determined to be the latest of:
the start time of the first iteration (of any team that can be assigned to the work item) that is at or after the earliest possible start for the current work item; and
the start time of the first iteration (of any team) that is after the end time of any preceding work items which the work item in question is dependent on.

The earliest possible start time for the current work item is determined according to the latest end time of any work item(s) the current work item is dependent on. The end times of work items are determined as the scheduling process progresses and work items are scheduled.

In the present process the upper bound of the time interval is initially determined to be the planning horizon $\hat{T}$. In the release aware scheduling process described in section 4 below a different upper bound of the time interval may be used.

Over the course of process 206 each team g in the set of teams $\mathcal{G}$ is in turn considered with respect to the current work item p. If the current team being considered yields the best scheduling solution for the current work item so far, that scheduling solution is adopted as the current optimal solution. Otherwise the scheduling solution for the current team is discarded and the next team is considered (provided there are further teams).

At 504 a current team to be considered to schedule the current work item is selected. The teams may be considered in any deterministic order.

At 506 an attempt is made to identify a team-specific scheduling solution for the current work item. A team-specific scheduling solution is a solution in which the work item (selected at 204) is assigned to one or more specific resources of the current team (selected at 504) to be completed. The team-specific scheduling solution need not necessarily involve all resources of the specific team. Two methods for identifying a team-specific scheduling solution for a given work item are described in detail below: one with reference to FIG. 6 and the other in with reference to FIG. 7 and FIG. 8.

If a team-specific scheduling solution for the current team is identified at 506, a set of assignments (e.g. tuples) is returned. Each assignment defines an activity of the work item, a resource (assigned to work on the activity), an iteration (in which the resource works on the activity), a resource commitment (e.g. a number of story points, hours, or other measure that the resource will spend on the activity in the iteration), and one or more skill(s) (used by the resource to work on the activity). An assignment also defines (or is associated with) a number of iteration violations (0 or more). If no team-specific scheduling solution for the current work item/current team is identified a message is returned advising of this.

At 508 the output of the current work item scheduling attempt performed at 506 is checked. If scheduling the current work item using the current team was not possible the process proceeds to 510.

If, at 506, a team-specific scheduling solution for the current work item/current team was identified, a check is performed at 512 to determine whether the solution is the best or optimal solution so far. If there is no current optimal solution the solution identified at 506 is the optimal scheduling solution. If there is a current optimal solution this is compared against the solution returned by 506 using the following optimization:
1) The solution returned at 506 is preferable to the current optimal solution if it has fewer iteration violations.
2) If the number of iteration violations of the solution returned at 506 is equal to the number of iteration violations of the current optimal solution the solution returned at 506 will be preferable if the solution returned at 506 has an earlier end date.

If the solution returned at 506 and the current optimal solution have the same number of iteration violations and the same end date the solutions are equivalent from an optimization perspective. In this case either solution can be adopted (e.g. the solution most recently returned at 506 may be treated as not being the optimal solution).

If the solution returned at 506 isn't better than the current optimal solution the process proceeds to 510 to see whether additional teams need to be processed.

If the solution returned at 506 is better than the current optimal solution (or there is no existing optimal solution) the returned solution is recorded as the current optimal solution at 514. In addition, if the solution returned at 506 has an earlier end date than the current optimal solution the upper time bound is updated to reflect the earlier end date provided by the solution returned at 506. The process then proceeds to 510 to see whether additional teams need to be checked.

At 510 a check is performed to determine whether one or more teams exist for which an attempt to identify a potential scheduling solution has not yet been made. Once an attempt has been made to identify a team-specific scheduling solution for a given team that team is not reconsidered for the current work item. If additional teams do exist, the process returns to 504 to select the next team and to try and identify (at 506) a scheduling solution for that team.

If, at 510, no further teams exist a check is performed at 516 to determine if a scheduling solution exists for the current work item (e.g. whether there is a currently recorded optimal solution). If so the optimal scheduling solution is returned and the work item is scheduled according to that solution.

If, at 516, no scheduling solution exists an error is returned at 518. In this case it was not possible to automatically schedule the work item. If the work item cannot be scheduled the error is raised, for example, by displaying a message on a user interface advising a user that the work item cannot be scheduled. If a work item cannot be scheduled any downstream work items that are dependent on the unschedulable work item will also be unschedulable. The error message may also advise the user of such downstream dependent work items. Unschedulable work items (and work items dependent on such work items) are removed from the backlog of work items.

Identifying a Team-Specific Scheduling Solution for a Given Work Item and a Given Team: 506

During the work item scheduling process (at 506) each team g in the set of teams $\mathcal{G}$ is iterated through to try and identify a team-specific scheduling solution for that team (or, specifically, for one or more resources of that team) for the given work item p.

Generally speaking this process aims to identify a scheduling solution for the given work item that (primarily) minimizes the number of iteration violations and (secondarily) has the earliest end time for the work item. One process for identifying a team-specific scheduling solution will be described with reference to FIG. 6. An alternative process for identifying a team-specific scheduling solution is described in section 3 below (with reference to FIG. 7 and FIG. 8)

As described above a work item p has a specified sequence of activities $\mathcal{A}$. Each activity a has an associated work demand $\mathcal{D}$ and a maximum limit L being the maximum number of resources that may work on the activity. A team has a specified iteration sequence ($\mathcal{T}_g$) and defined resources ($\mathcal{R}_g$), each resource having one or more skills ($S_r$) and availability ($\mathcal{R}_{rt}$) within the iterations of the team.

At 602 the next activity a in the sequence of activities $\mathcal{A}$ for the work item is selected.

At 603 an activity specific set of resources is generated. The activity specific set of resources comprises resources from the team (selected at 504) that can contribute to the specific activity (selected at 602). The ability to contribute is based on the skill(s) held by a resource and the skill(s) required by the activity—if a resource does not have any skills required by the activity it cannot contribute and is not included in the activity specific set of resources.

At 604 an ordered queue of solution candidates is generated for the current activity of the work item. Generating the solution candidate queue for an activity involves generating solution candidates and heuristically ordering them by their solution quality.

A solution candidate for a given activity comprises two components: a resource subset (i.e. a subset of the activity specific set of resources generated at 603) and a set of iterations in respect of that resource subset.

The resource subset of a solution candidate is a subset of resources within the team that have the skills needed to work off the activity. The cardinality of the resource subset is less than or equal to the maximum resource limit for the activity. The number of possible resource subsets is exponentially proportional to the total number of resources in the activity specific set of resources generated at 603. Where the number of resource subsets/solution candidates is manageable from a computational perspective (i.e. can be processed in an acceptable amount of time), solution candidates for al possible resource subsets are generated and considered.

In one embodiment, a solution candidate threshold is introduced to place a limitation on the number of resource subsets (and, accordingly, solution candidates) that are processed/examined. In one implementation the solution candidate threshold is set at 1000, but alternative thresholds may be used. If the number of possible resource subsets is less than the solution candidate threshold all resource subsets are considered. If, however, the number of possible resource subsets exceeds the solution candidate threshold not all resource subsets are considered. Rather, the number of resource subsets (and solution candidates) is limited to the threshold, for example by a probability based selection process in which only the threshold number of resource subsets is generated.

The set of iterations of a solution candidate includes iterations of the team that the resources in the solution candidate resource subset are part of. Each iteration in the set of iterations is associated with an iteration start time and an iteration end time and/or iteration duration. Initially, the set of iterations for each solution candidate is populated with a single iteration, the single iteration being the earliest possible iteration for the team (i.e. the iteration with the earliest start time which is at or after the earliest start time for the task being scheduled).

The heuristic by which the solution candidates in the queue are ordered is as follows:

1) A solution candidate with fewer iterations is preferred over a solution candidate with more iterations (the number of iterations being the cardinality of the candidate's iteration set).
2) If two or more solution candidates have the same number of iterations, the solution candidate whose latest iteration in its iteration set has the earliest end time is preferred.
3) If two or more solution candidates have the same number of iterations and the same earliest end time, the candidate with the lower heuristic resource cost (discussed below) is preferred.

The heuristic resource cost is a measure of the value/cost of a given resource. In one implementation resource cost for a given resource is calculated to be the sum of the skil costs (described below) for all skills held by that resource.

The skill cost of a particular skill is a measure of how valuable that skill is. Generally speaking, a skill that is held by many resources is less valuable (and will have relatively low skill cost) than a skill held by fewer resources. Conversely, a skill that is not held by many resources is more valuable (and will have a relatively high skill cost). In one embodiment the skill cost of a particular skill held by a given resource from a given team is heuristically calculated based on the scarcity (or abundance) of that skill across the team. Specifically, the skill cost for a given skill held by a resource is calculated to be 1/(the total number of resources in the team who have that skill (including the resource in question)).

At 606 a check is performed to see whether the solution candidate queue is empty. If the solution candidate queue is empty at this stage no scheduling solution for the activity (or, consequently, the work item as a whole) can be found. In this case a message is returned at 608 advising that no scheduling solution for the work item could be identified for the current team.

If the solution candidate queue is not empty at 606, the best solution candidate in the queue as identified at 610. As described above, the best solution candidate is the candidate with the least number of iterations in its iteration set (i.e. with the lowest iteration set cardinality). If two or more candidates have the same iteration set cardinality, the next best candidate is the candidate whose latest iteration in its iteration set has the earliest end time. If two or more candidates have the same number of iterations and the same earliest end time, the first such candidate in the queue is selected.

At 612 an attempt is made to identify an actual assignment of the activity to the resources of the solution candidate identified at 610. An actual assignment will need to satisfy the work demanded by the activity and, at the same time, respect the availability constraints of the resources in the candidate's resource subset. In one embodiment this problem is modeled as a linear program and is solved efficiently using the Simplex algorithm. Alternative linear programming algorithms could be used.

As noted, a solution candidate is defined by:

A set or resources $\mathcal{R}_s \subseteq \mathcal{R}_g$ of a single team $g \in \mathcal{G}$; and a set of consecutive iterations $\mathcal{T}_s \subseteq \mathcal{T}_g$ of this team.

The resulting activity schedule consists of a set of values $x_{arts} \in \mathbb{R}_0^+$ quantifying the work of resource r in iteration t with skill s. To identify the values the following linear program is solved:

$$\min \sum_{r \in R_s} w_r \sum_{s \in S_r} x_{rs} \qquad \text{Definition 24}$$

$$\sum_{s \in S_r} x_{rs} \leq \sum_{t \in T_s} R_{rt} \qquad r \in R_s \qquad \text{Definition 25}$$

$$\sum_{r \in R_s} x_{rs} = D_{as} \qquad s \in S_a \qquad \text{Definition 26}$$

$$x_{rs} \in \mathbb{R}_0^+ \qquad r \in R_s, s \in S_r \qquad \text{Definition 27}$$

The variables $x_{rs}$ define how much work resource r has to contribute with skill s. The third constraint (definition 26) ensures that the work demand $D_{as}$ is met for each required skill, whereas the second constraint (definition 25) implements the availability limitation over all iterations assigned to the solution candidate. Finally the objective function minimizes the resource cost of for the activity schedule based on the heuristic resource value. After the overall contributions for each resource have been calculated corresponding values for each iteration are identified by finding the values for $x_{arts}$. The highest possible value for each iteration is then assigned in ascending order.

At 614 a check is performed to determine if an assignment for the candidate exists (i.e. if the attempt to identify an assignment for the candidate at 612 was successful).

If an assignment exists, at 616 the assignment is added as the solution for the current activity of the work item being processed. The assignment includes a number of resource assignments, each resource assignment defining the activity in question, a resource assigned to the activity (taken from the solution candidate), the iteration(s) in which the resource will work on the activity, a resource commitment (e.g. number of story points, hours, or other measure that the resource will spend on the activity in the iteration), and one or more skill(s) that the resource will use working on the activity. An assignment also defines (or is associated with) a number of iteration violations (0 or more) taken from the solution candidate.

At 618 a check is then performed to determine whether the work item has any unscheduled activities.

If unscheduled activities exist at 618 the process returns to 602 to select the next activity.

If no unscheduled activities exist at 618 all activities of the work item have been successfully assigned. In this case the identified solution (comprising a set of the assignments of all activities in the work item) is returned at 620 and the process ends.

Returning to the check performed at 614, if no solution for the current candidate exists, a check is performed at 622 to determine if the current candidate is still valid. This involves first checking to determine if the availability of the resources assigned to the solution candidate remains constant after the actual iteration(s). If this is not the case the solution is considered valid until the next test is performed. If the future availabilities do remain constant a check is then performed to determine if the limited resources (having availability 0 in the future) can satisfy the work demand of their exclusive skill set (the skills only available in limited resources). If there is no solution for this sub-problem the solution candidate will not be valid in the future.

If the candidate is determined to be invalid at 622 it is removed from the queue of solution candidates at 624. The process then returns to 606 to see whether solutions for candidates (if any) that remain in the queue exist.

If the candidate is determined still to be valid at 622, the candidate remains in the queue but is updated. In updating a candidate the resource selection for the candidate remains the same but the set of iterations in respect of the candidate is amended.

If, at 622, the candidate is still valid, at 626 a check is performed to see if the cardinality of the candidate iteration set is greater than one. If the cardinality of the iteration set is greater than one, the iteration set for the candidate is updated at 628 by adding the team's next iteration (i.e. the iteration occurring after the last iteration currently in the candidate's iteration set) to the candidate's iteration set. This gives the candidate resources more time to perform the work required by the activity. The process then returns to 606.

If, at 626, the cardinality of the candidate iteration set equals one, a check is performed at 630 to determine if the single iteration in the candidate's iteration set is currently free.

If the single iteration is not free there is the potential that the subset of resources defined by the candidate could complete the activity in a single iteration if that iteration was free. In this case the candidate iteration set is updated at 632 by replacing the current iteration with the team's next iteration and the process returns to 606.

If at 630 the single iteration in the candidate's iteration set is free (i.e. there is no work already booked for the candidate resources in that iteration) it is determined that the candidate resources cannot complete the activity in a single iteration.

In this case the candidate iteration set is updated by adding the next iteration to the set at 628 before the process returns to 606.

Having an activity extend across multiple iterations reduces the quality of the solution candidate significantly. A solution candidate with more than one iteration in its iteration set will only be considered if there are no solution candidates in the queue which can potentially complete the activity in a single iteration (i.e. have an iteration set with a cardinality of one).

2.2 Iteration Aware Scheduling Clauses

Described herein is a computer implemented scheduling method comprising: accessing project data from computer readable storage media, the project data comprising: work item data defining a plurality of work items to be scheduled; resource data defining a plurality of resources; team data defining a plurality of teams, each team made up of one or more resources and having a schedule of iterations; for each work item: processing, using a computer processor, the project data to determine one or more team-specific scheduling solutions for the work item, each team specific scheduling solution for the work item defining a particular team and one or more iterations of that particular team in which the work item can be completed; identifying from the one or more team-specific scheduling solutions an optimal scheduling solution for the work item, the optimal scheduling solution being selected based at least in part on the number of iterations defined by each of the one or more team-specific scheduling solutions; and scheduling the work item according to the optimal scheduling solution identified for the work item.

An optimal scheduling solution may be determined to be a team-specific scheduling solution defining the fewest number of iterations.

If multiple team-specific scheduling solutions define a same least number of iterations, the optimal scheduling solution may be determined to be the team-specific scheduling solution which defines the least number of iterations and an earliest work item completion time.

Processing the project data to determine one or more team-specific scheduling solutions for a given work item may comprise; for each team available to work on the given work item, processing the project data to try and determine a team-specific scheduling solution for the given work item for that team.

Each work item may comprise one or more work item activities, and wherein processing the project data to determine a team-specific scheduling solution in respect of a given work item and a given team may comprise: processing the project data to determine a final assignment for each activity of the given work item, the team specific scheduling solution for the given work item comprising the final assignments for all activities of the given work item, and wherein a final assignment in respect of a particular activity of the given work item defines a sub-team of the given team and one or more iterations in which the sub-team can complete the particular activity of the given work item.

Determining a final assignment for a given activity of a given work item for a given team may comprise: generating a queue of solution candidates, each solution candidate defining a sub team of the given team and one or more iterations; determining a heuristic solution quality for each solution candidate in the queue of solution candidates; selecting a current solution candidate from the queue of solution candidates, the current solution candidate being the solution candidate with the best heuristic solution quality, determining whether an assignment for the given activity and current solution candidate exists; and responsive to determining that an assignment for the given activity and current solution candidate exists, determining that assignment to be the final assignment for the given activity; or responsive to determining that no assignment for the given activity and current solution candidate exists, attempting to determine an assignment for the given activity and a different or updated solution candidate.

The heuristic solution quality for a given solution candidate may be based on the number of iterations defined by the given solution candidate and an end time of a latest iteration defined by the solution candidate.

The method may further comprise processing the project data to identify and remove from further processing work items that cannot be scheduled.

The project data may further comprise dependency data defining one or more dependency relationships between work items, and wherein identifying and removing work items that cannot be scheduled may comprise processing the dependency data to identify and remove work items with cyclic dependencies.

Identifying and removing work items that cannot be scheduled may further comprise identifying and removing work items which are dependent on a work item with a cyclic dependency.

The project data may further comprise: work item skill data defining, for a given work item, one or more skills required in order to complete the given work item, and resource skill data further defines, for a given resource, one or more skills held by the given resource; and wherein identifying and removing work items that cannot be scheduled may comprise processing the project data to identify and remove any work items that require at least one skill that is not held by any resource.

The method may further comprise processing the project data to identify and remove from further processing resources that cannot contribute to the completion of any work item.

The project data may further comprise: work item skill data defining, for a given work item, one or more skills required in order to complete the given work item, and resource skill data further defines, for a given resource, one or more skills held by the given resource; and wherein identifying and removing resources that cannot contribute to the completion of any work item may comprise processing the project data to identify and remove any resource that does not hold one or more skills required by any work item.

Also described herein is a system comprising: one or more processors; one or more non-transitory computer-readable storage media storing sequences of instructions which, when executed by the one or more processors, cause the one or more processors to perform the a method as described in the preceding paragraphs.

3. Automatic Assignment of Work Items to Team Resources

Figure 6:
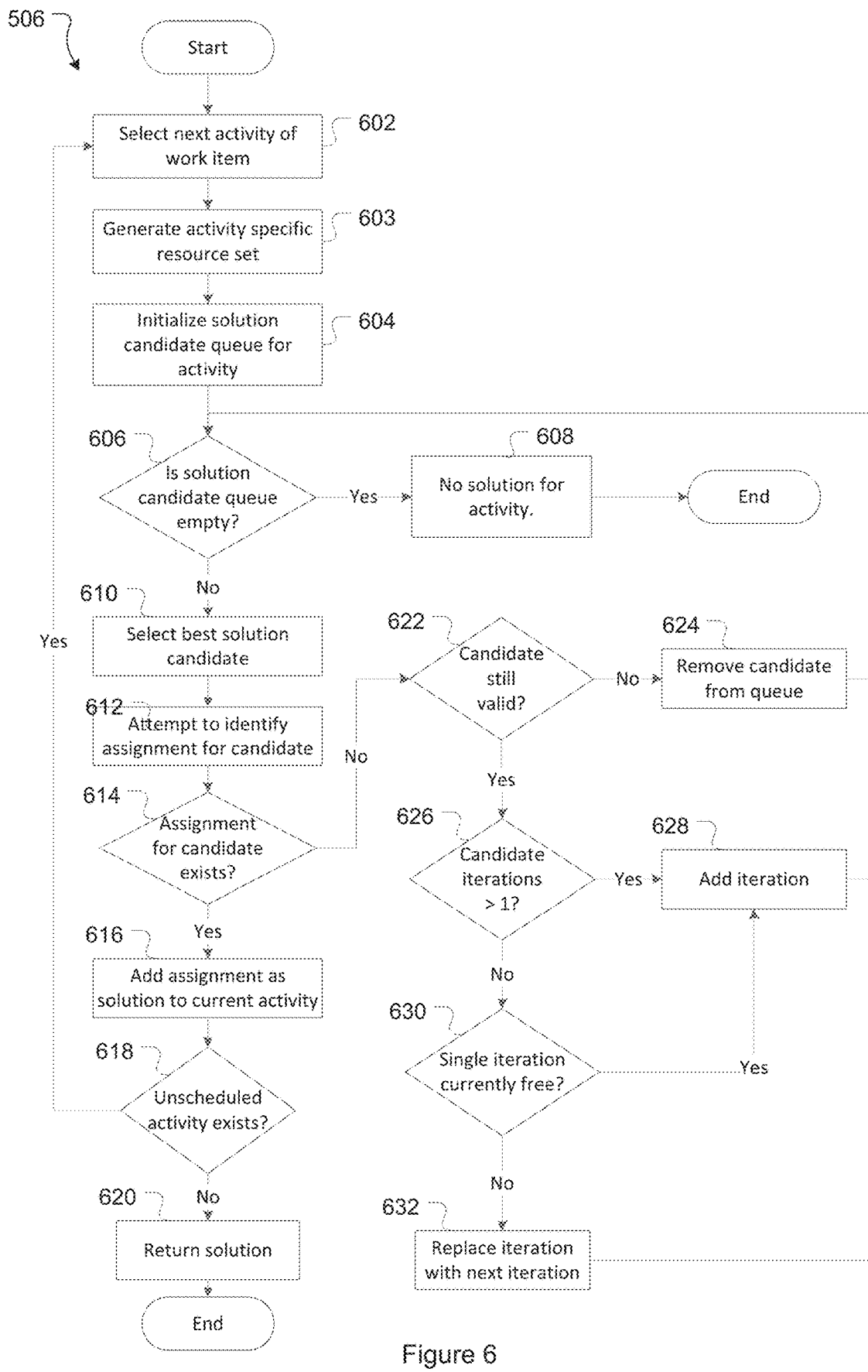
FIG. 6 is a flowchart illustrating a process for identifying a scheduling solution for a work item in accordance with one embodiment.

In the iteration aware scheduling process described above, attempting to schedule a selected work item (process 206 described with reference to FIG. 5) involves attempting to identify a team-specific scheduling solution for the work item (process 506 described with reference to FIG. 6). A team specific scheduling solution for a work item is a solution whereby the work item is assigned to one or more members of the specific team (not necessarily the whole team). Process 506, in turn, involves identifying solution candidates (at 602).

As noted, the number of potential solution candidates grows exponentially with the number of resources in the team being considered. This is due to the fact that if there is a team with n resources having at least one skill required for the work item, and a maximum resource constraint (L—being the total number of resources that can work on the work item) of k, the number of possible resources assignments is "n choose k". Practically speaking this prohibits the complete examination of the solution space.

In order to limit the solution space the number of solution candidates is limited to a solution candidate threshold. This section describes an alternative computer implemented process identifying a team-specific scheduling solution for a work item that uses probabilistic sampling to select solution candidates and, ultimately, allocate resources to work items.

Figure 7:
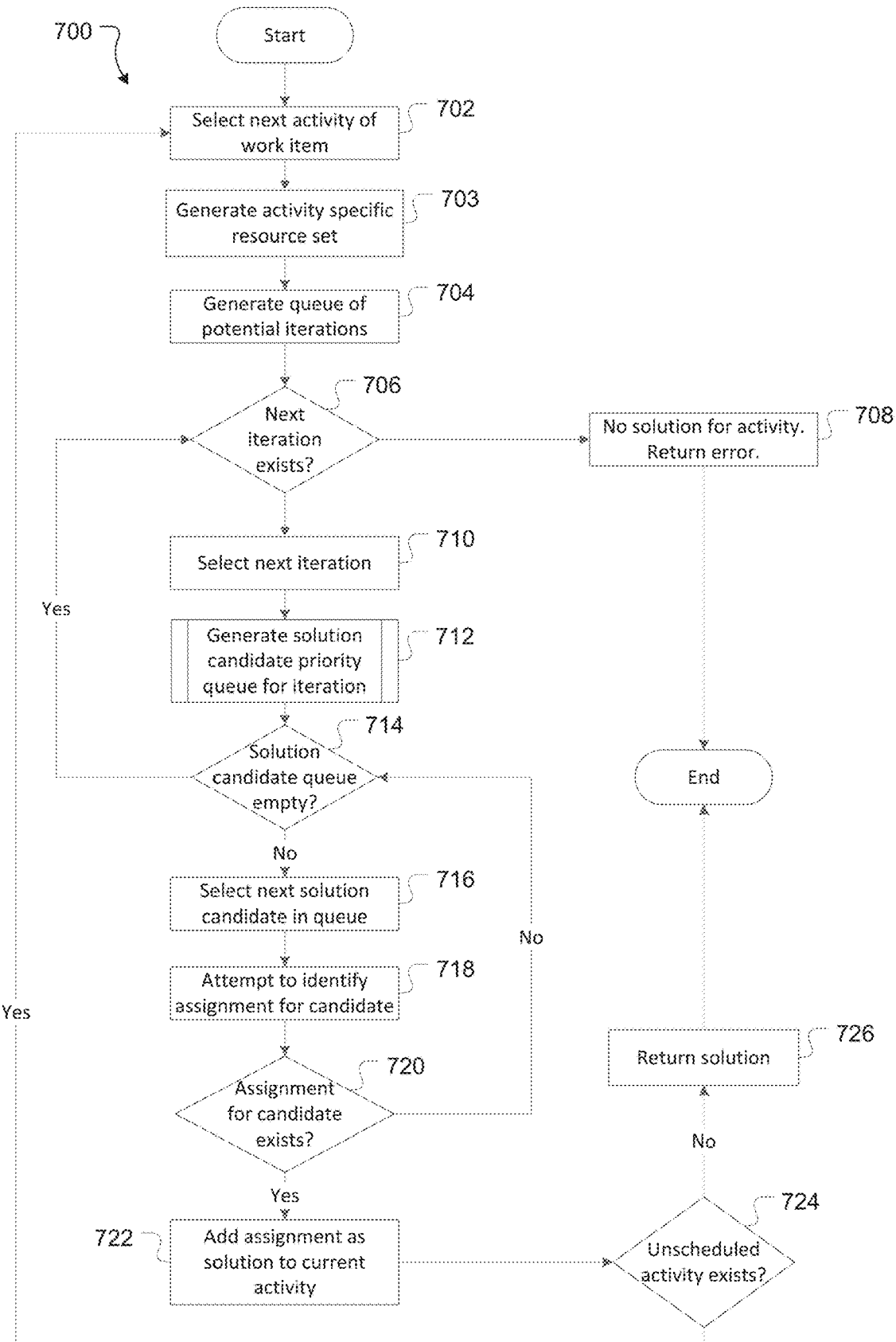
FIG. 7 is a flowchart illustrating a process for identifying a scheduling solution for a work item in accordance with an alternative embodiment.
Figure 8:
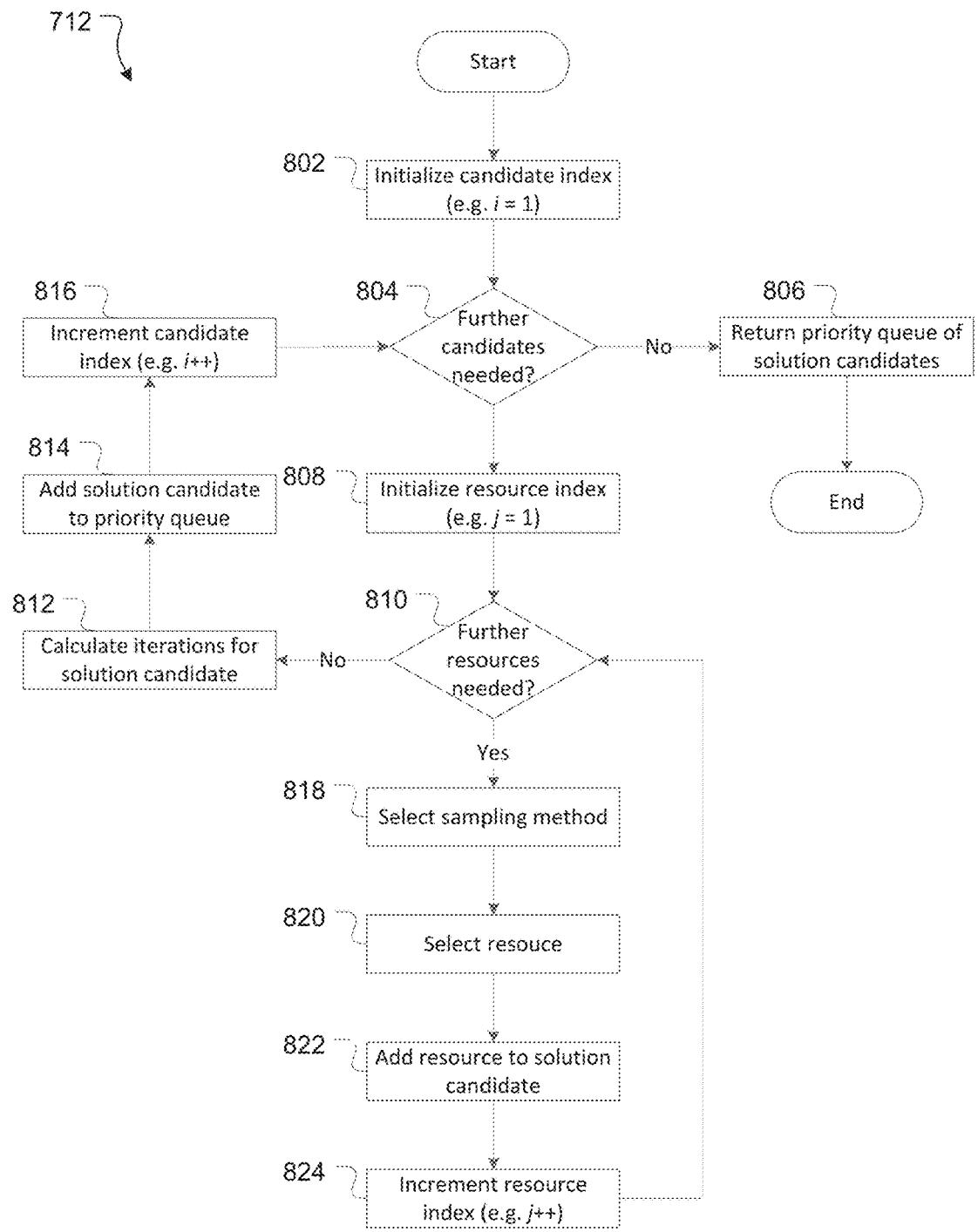
FIG. 8 is a flowchart illustrating a process for generating a set of solution candidates.

3.1 Computer Implemented Method for Automatically Assigning Work Items to Team Resources FIG. 7 provides a flowchart 700 depicting processing to identify a team specific scheduling solution for a work item in accordance with an embodiment. The processing described in this section and shown in FIG. 7 provides an alternative process for identifying a team specific scheduling solution to process 506 described above with respect to FIG. 6.

As with process 506, the inputs to process 700 comprises a particular work item p (selected at 204), a team g (selected at 504) for which a scheduling solution for the work item is to be identified, and a time range (defined at 502). The work item p has a sequence of activities $\mathcal{A}$, each activity a in the sequence having an associated work demand $\mathcal{D}_{as}$ and a maximum constraint limit L (the maximum number of resources that may work on the activity). A team has a specified iteration sequence ($\mathcal{T}_g$) and defined resources ($\mathcal{R}_g$), each resource having one or more skills ($S_r$) and availability ($\mathcal{R}_{rt}$) within the iterations of the team.

At 702 the next activity a in the sequence of activities $\mathcal{A}$ for the work item is selected.

At 703 an activity specific set of resources is generated. The activity specific set of resources comprises resources from the team (selected at 504) that can contribute to the specific activity (selected at 602). The ability to contribute is based on the skill(s) held by a resource and the skill(s) required by the activity—if a resource does not have any skills required by the activity it cannot contribute and is not included in the activity specific set of resources.

At 704 a set of potential iterations in respect of the activity is generated. This involves identifying iterations of the team in question that have a start time on or after the earliest start time for the activity and an end time before or at the latest end time of the activity.

At 706 a check is performed to determine if there a next iteration exists in the set of potential iterations identified at 704. If not, all potential iterations have been checked for the activity and no schedule has been identified. In this case a message indicating no solution was found is returned at 708 and process 700 ends.

If a next iteration does exist at 706, this iteration is selected at 710. The next iteration is the iteration with the earliest start time.

At 712 a set of solution candidates for working off the activity selected at 702 in the iteration selected at 710 is generated. In this implementation the set of solution candidates is a priority queue, but alternative data structures for storing solution candidates with associate priority could be used. Processing to generate the set of solution candidates at 712 is described in further detail below with reference to FIG. 8.

Generally speaking, the solution candidates in the set are considered in turn according to their associated priorities. An attempt to identify an assignment of the activity to the solution candidate is made and, if successful, that assignment is accepted. If not the next solution candidate in the set is considered.

At 714 a check is performed to see whether the solution candidate queue is empty. If the solution candidate queue is empty the process returns to 706 to determine whether a next iteration exists that can be checked.

If the solution candidate queue is not empty at 714, the next solution candidate in the queue is identified at 716 (based on the solution candidate priority).

At 718 an attempt is made to identify an actual assignment of the activity to the solution candidate identified at 716. Attempting to identify an assignment of the activity to the solution candidate is the same process as described above with respect to processing stage 612 of process 506.

At 720 a check is performed to determine if an assignment for the solution candidate exists. If no assignment is returned by 718 the process returns to 714 to determine whether other solution candidates exist.

If an assignment for the candidate does exist, at 722 the assignment is added as the solution for the current activity of the work item being processed.

At 724 a check is then performed to determine whether the work item has any unscheduled activities. If unscheduled activities exist the process returns to 702 to select the next activity.

If no unscheduled activities exist at 724 all activities of the work item have been successfully assigned. In this case the identified solution (comprising a set of the assignments of all activities/resources in the work item) is returned at 726 and process 700 ends. Each assignment defines the activity in question, a resource assigned to the activity (taken from the solution candidate), the iteration(s) in which the resource will work on the activity, a resource commitment (e.g. the number of story points, hours, or other measure) indicating how much work the resource is assigned to work on the activity in the iteration, and one or more skill(s) that the resource will use working on the activity. An assignment also defines (or is associated with) an iteration count taken from the solution candidate.

When performing the check at 512 to determine whether a given solution is the best or optimal solution so far the iteration count is treated similarly to the iteration violations described above. The number of iteration violations is equal to the iteration count minus 1 (i.e. an iteration count of 1 does not indicate any iteration violations as the work is completed in a single iteration, whereas an iteration count of 2 indicates a single iteration violation). I.e.

1) The solution returned at 506 is preferable to the current optimal solution if it has a lower iteration count;
2) If the iteration count of the solution returned at 506 is equal to the iteration count of the current optimal solution, the solution returned at 506 will be preferable if it has an earlier end date.

Solution Candidate Queue Generation: 712

At 712 of process 700 the data is processed to generate set of solution candidates. In this example the set of solution candidates is a priority queue. This processing will be described with reference to FIG. 8.

As discussed above, a solution candidate is a subset of resources selected from the activity specific set of resources (selected at 703) that will be considered to work off a particular activity (selected at 702) in one or more iterations (selected at 710).

The data processed in order to generate individual solution candidates and the priority queue of solution candidates comprises: the set of skills s required to work off the activity a being considered ($\mathcal{D}_{as}$); the resources r in the activity specific set of resources generated at 703; the skills s of each resource r ($S_r$); the availability of each resource in the iteration t being considered ($R_{rt}$); the maximum number of resources r permitted to work on the activity a (L); and the threshold number of solution candidates to be generated (n). As noted above, in one implementation the threshold number of solution candidates is 1000.

Two aspects are considered when processing the data to select a subset of resources for a solution candidate:
1) Skills: the subset of resources for a solution candidate must have the skills required to work off the activity.
2) Availability: resources with higher availability in the particular iteration are preferable+.

The first of these aspects (selecting a subset of resources from the particular team that have the requisite skill(s) to work off the activity) is a set cover problem (SCP). The set cover problem is known to be NP-complete and as such is not efficiently solvable for large problem instances.

In order to address this, the present method introduces a probabilistic sampling method for selecting resources to be added to the subset of resources for a given solution candidate. Resources to be added to the resource subset for a solution candidate are selected in turn by sampling the set of available resources for the solution candidate. Two different sampling methods are used: one that selects a resource based on skills and one that selects a resource based on availability. Furthermore, in order to improve robustness, the probability of one or the other sampling method being used to select a resource is weighted according to which solution candidate is being generated.

In process 800 a candidate index i is maintained to record which particular solution candidate (out of the threshold number n of solution candidates) is currently being generated. At 802 the candidate index i is initialized to indicate that the first solution candidate is being generate (e.g. i=1).

At 804 a check is performed to determine whether further solution candidates need to be generated. If the candidate index i indicates that the threshold number of solution candidates have been generated (e.g. i>n) no further candidates are required and at 806 the priority queue of solution candidates is returned. If further solution candidates do need to be generated, the process proceeds to 808.

Generating a solution candidate involves selecting k resources that will make up the resource subset for the candidate, k is the maximum number of resources permitted to work on the activity in question which, in turn, is based on the maximum number of resources permitted to work on the work item which the activity is part of –L). In order to generate a given solution candidate i, a resource index j is maintained to track the number of resources that have been generated. At 808 j is initialized to indicate the first resource for the resource subset is being selected (e.g. j=1).

At 810 a check is performed to determine whether further resources need to be selected for the resource subset. If the resource index j indicates that the maximum number of resources have been selected (i.e. j>k) no further resources need to be selected.

If, at 810, no further resources need to be selected an iteration set for the solution candidate is generated. The iteration set defines the iterations assigned to the solution candidate. The iterations for the solution candidate include all iterations between (and including) the last free iteration for the solution candidate's resource subset (i.e. the last iteration in which all resources selected for the candidate were free) and the current iteration (selected at 710) for which the solution candidate priority queue is being generated. An iteration count is also calculated for the solution candidate, the iteration count being the number of iterations in the iteration set. As described above, the iteration count is used at 512 to determine the quality of one solution candidate compared to another.

At 814 the solution candidate i is added to the solution candidate priority queue. The priority of the new solution candidate being added to the queue is determined according to the following:
1) If the new solution candidate has a lower iteration count than an existing solution candidate the new solution candidate is assigned a higher priority.
2) If the new solution candidate has the same iteration count as an existing solution candidate, the solution candidate with the lower skill cost has a higher priority.

The skill cost of a given solution candidate is the sum of the resource costs of the resources in that solution candidate. As described above, the resource cost of a resource is a measure of the value/cost of that resource and is, in turn, calculated as the sum of the skill costs of all skills held by that resource. The calculation of skill costs is described above.

At 816 the candidate index i is incremented (e.g. i=i+1) and the process returns to 804 to determine whether further solution candidates need to be generated.

If, at 810, further resources do need to be selected, the sampling method to be used to select the next resource is determined at 818.

In the present embodiment a resource can be selected using one of two sampling methods.

The first sampling method is a skill based sampling method. Given the skills demanded by the activity and the skills provided by a partial solution to the activity, the skill based sampling method seeks to select the resource that provides the most demanded but not yet provided skills. Ties are resolved randomly.

The skill based sampling method can be illustrated by the following example. Consider: an activity requiring skills {1, 2, 3}; available resources are {A, B, C}; the skills of resource A $S_A$={1, 2}; the skills of resource B $S_B$=(2); and the skills of resource C $S_C$={3}. Initially, the required skills are {1, 2, 3} so resource A is selected because it has two of the required skills (versus resources B and C which each only have 1 of the required skills). Following this, the remaining skills required are {3}, leading to resource C being selected as it has one of the required skills (versus resource B who has 0 of the required skills).

The second sampling method is an availability based sampling method. In one embodiment the availability based sampling method involves implementing a roulette-wheel (or fitness proportionate) selection process in which selection of a resource is based on the availability value of the resource in the iteration being considered. Using this approach the likelihood of a resource being selected is directly proportional to the availability of that resource within the iteration divided by the overall availability of the other available resources for the iteration. For example, if the availability of a particular resource within an iteration is 10 time units, and the total availability of the all resources available within the iteration is 200 time units, the probability of the particular resource being selected is $$\frac{10}{200} = 0.05.$$

In order to improve robustness of the resource selection the skill and availability based sampling methods are heuristically combined. In the present implementation this involves probabilistically selecting the sampling method to be used to select the next resource at 816. The probability p of using the skill based sampling method is calculated based on the index i of the solution candidate currently being generated (i.e. the solution candidate for which a resource is being selected) and the total number n of solution candidates that are to be generated: p=i/n. The probability of using the availability based sampling method to select a resource is 1−p.

Calculating p in this manner results in the skill based sampling method being less likely to be used when selecting resources for earlier generated solution candidates (i.e. solution candidates being generated earlier in the queue generation process 712) and more likely to be used when selecting resources for later generated solution candidates (i.e. solution candidates being generated later in the queue generation process 712). Put conversely, calculating p in this manner results in the availability based sampling method being more likely to be used when selecting resources for earlier generated solution candidates and less likely to be used when selecting resources for later generated solution candidates.

For example, consider a process with a threshold number of solution candidates of n=1000. During generation of the first solution candidate (i=1): the probability of selecting a resource using the skill based sampling method is $$\frac{i}{n} = 0.001$$

and the probability of selecting a resource using the availability based sampling method is $$\left(1 - \frac{i}{n}\right) = 0.999$$

During generation of the 500$^{th}$ candidate (i=500) the probabilities of selecting a resource using the skill based sampling method and the availability based sampling method are the same:

$$\frac{i}{n} = 0.05, \left(1 - \frac{i}{n}\right) = 0.5.$$

Following selection of the resource sampling method at 818, the selected sampling method is used to select a resource at 820.

At 822 the resource selected at 820 is added to the current solution candidate.

At 824 the resource index j is incremented (e.g. J=j+1) and the process returns to 810 to determine whether further resources need to be selected for the current solution candidate.

3.2 Automatic Assignment of Work Items to Team Resources Clauses

Described herein is a computer implemented method comprising: accessing project data from computer readable storage media, the project data comprising: work item data defining a work item; activity data defining one or more activities that form part of the work item; team data defining a team of resources; a maximum resource constraint defining a maximum number of resources able to work on the work item; a solution candidate threshold defining a maximum number of solution candidates; for the or each activity forming part of the work item: processing, using a computer processor, the project data to generate a set of solution candidates for the activity; selecting a solution candidate from the set of solution candidates; processing the project data to attempt to identify an assignment of the activity to the selected solution candidate; and responsive to identifying an assignment of the activity to the selected solution candidate, assigning the activity to the selected solution candidate, wherein: a solution candidate comprises a subset of resources from the team of resources; generating a set of solution candidates for an activity comprises generating a number of solution candidates which is less than or equal to the solution candidate threshold; generating a given solution candidate comprises selecting a number of resources for inclusion in the subset of resources for that solution candidate, the number of resources being equal to the maximum resource constraint; and selecting a given resource for inclusion in a solution candidate subset comprises: selecting a sampling method; using the selected sampling method to select a resource from the team of resources.

Selecting a sampling method may comprise probabilistically selecting a sampling method.

Selecting a sampling method may comprise probabilistically selecting either a first sampling method or a second sampling method.

A probability of selecting the first sampling method may be weighted according to an index of the solution candidate being generated.

The first sampling method may be a skill based sampling method.

The activity data may further define, for the or each activity, skills required to complete the activity; the project data may further comprise resource data, the resource data defining, for each resource, one or more skills held by the resource; and wherein the skill based sampling method may involve selecting a resource which holds skills that are most demanded by the activity but not yet provided by any other selected resource.

The second sampling method may be an availability based sampling method.

The project data may further comprise resource data, the resource data defining, for each resource, availability of the resource; and the availability based sampling method may involve selecting a resource from the team of resources based on an availability of that resource relative to availability of other resources in the team of resources.

Generating a given solution candidate may further comprise calculating a priority in respect of the solution candidate, and selecting a solution candidate comprises selecting the solution candidate with the highest priority.

Responsive to not identifying an assignment of the activity to the selected solution candidate, the method may further comprise: selecting a further solution candidate from the set of solution candidates; processing the project data to attempt to identify an assignment of the activity to the further solution candidate; and responsive to identifying an assignment of the activity to the further solution candidate, assigning the activity to the second solution candidate.

The team data may further define one or more iterations in which the team works; a set of solution candidates for a given activity may generated for a particular iteration of the team; and if no assignment of the given activity to any of the solution candidates in a set of solution candidates is possible, the method may further comprise: generating a further set of solution candidates for the given activity using a next iteration of the team; selecting a solution candidate from the further set of solution candidates; processing the project data to attempt to identify an assignment of the activity to the selected solution candidate; and responsive to identifying an assignment of the activity to the selected solution candidate, assigning the activity to the selected solution candidate.

Also described herein is a system comprising: one or more processors; one or more non-transitory computer-readable storage media storing sequences of instructions which, when executed by the one or more processors, cause the one or more processors to perform the a method as described in the preceding paragraphs.

4. Release Aware Scheduling

Section 2 above describes iteration aware scheduling methods/processes which schedule work items taking into account the iterations in which teams work. In the embodiment described the release aware scheduling extends the iteration aware scheduling described in sections 2 and 3 above to schedule work items while taking releases (e.g. project milestones, software releases, or other deliverables) into account. In alternative embodiments features and/or principles of the release aware scheduling may be used in conjunction with other scheduling methods/processes.

4.1. Release Aware Scheduling Problem Description

In the present embodiment the release aware scheduling process described herein extends the iteration aware scheduling described in sections 2 and 3 above. Accordingly, the data/concepts described in relation to the iteration aware scheduling process are also relevant to the release aware scheduling problem.

In addition to the data/concepts described above, the release aware scheduling problem takes into account releases. A release is denoted e and the set of all releases is denoted E (e∈E).

In order to schedule tasks taking into account releases, release start times and end times need to be considered.

The start time for a release may be a fixed (or not earlier than) start time—e.g. release n is to start at the earliest at time x. Alternatively, a release may have a start time dependent on a predecessor release—e.g.: release version 2.0 can start only after release version 1.0 is complete; work on milestone 2 can only start 2 weeks after milestone 1 is complete (e.g. so customers can give feedback on milestone 1); work on release version 2 can start up to 4 weeks before the estimated/scheduled end time of release work 1.0.

An end time for a release (i.e. the date/time by which all work items necessary to the release must be complete) may be a fixed end time—e.g. release 1.0 must be complete by time x. In this case the scheduling method described herein operates to suggest work items that can be fit into the scope of the release (i.e. work items that can be completed by the fixed end time). Alternatively, a release can have a non-fixed or dynamic end time. In this case the scheduling method described in this section operations to forecast an end time for the release taking into account work items that are essential to that release (i.e. work items that have been flagged as must-have deliverables for the release).

Two types of releases e are considered/distinguished: preferred end time releases and fixed scope releases.

A preferred end time release is a release with a preferred end time $et_e \in [0, \tilde{T}]$.

A fixed scope release does not have a preferred end time. Instead, a subset of the work items is strictly assigned to the release such that those work items must be included in the release.

These two types of releases mirror two problems in release scheduling, namely how much can be done until a defined deadline is reached and how long does it take to work off a given set of requirements.

The model described herein allows a release to be to have both a preferred end time and a fixed scope. In this case the work items strictly assigned to the release take precedence and the preferred end time assigned to the release may be exceeded (with an appropriate alert) in order to ensure all assigned work items are completed within the release.

The start date of a release may either be fixed or dependent in some way on a preceding release. The predecessor of a release is denoted $e^<$. This precedence relation is strictly linear and cannot involve a circular dependency.

Where a predecessor is defined so too is a start-time gap $\delta_e$ ($\delta_e \in \mathbb{N}$). The start-time gap defines how many time steps are allowed between the end of a predecessor release and the start of a release dependent on that predecessor release. The start-time gap may define a negative number of time steps.

For each work item/release pair a constant $Y_{pe}$ ($Y_{pe} \in \{0, 1\}$) is provided which defines whether the work item p has to be scheduled in the release e. This assignment is assumed to be exclusive, so for all work items $\sum_{e \in E} y_{pe} \leq 1$.

In order to incorporate releases into the mixed integer linear program, certain of the definitions in the iteration aware scheduling problem description above (section 2.1) are modified and additional definitions are provided. These modifications and additions are described below. Where a definition is either the same as or a modified version of a definition provided in the iteration aware scheduling problem the same definition number is used. Where a definition is new/specific to the release aware scheduling problem a new definition number is provided. To distinguish between the definitions in this section and the definitions in the iteration aware scheduling section above definitions in this section are denoted with a prime (') character.

Work Constraints

In order to incorporate releases the decision variable described in the iteration aware scheduling problem above is extended to take the assigned release into account. This is shown in the work constraints of definitions 1' and 2' below.

$$x_{earts} \in \mathbb{R}_0^+ \qquad \text{Definition 1'}$$
$$e \in E, a \in \mathcal{A}, r \in \mathcal{R}, t \in \mathcal{T}_r,$$
$$s \in S_{ar}$$

$$\sum_{e \in E} \sum_{a \in \mathcal{A}} \sum_{s \in S_{ar}} x_{earts} \leq \mathcal{R}_{rt} \qquad \text{Definition 2'}$$
$$r \in \mathcal{R}, t \in \mathcal{T}_r$$

Work Demand

Similar to the iteration aware scheduling problem above, optional work items are considered. This consideration is extended by defining these values for every release as per definitions 3', 28', and 4' below:

$$y_{pe} \in \{0, 1\} \qquad \text{Definition 3'}$$
$$p \in \mathcal{P}, e \in E$$

-continued $$y_{pe} \geq Y_{pe} \quad \text{Definition 28'}$$
$$p \in \mathcal{P}, e \in E$$

$$\sum_{r \in \mathcal{R}} \sum_{t \in \mathcal{T}_r} x_{earts} = y_{pe} * \mathcal{D}_{as} \quad \text{Definition 4'}$$
$$a \in \mathcal{A}, s \in \mathcal{S}_a, e \in E$$

Resource Assignment

In order to take releases into account minor changes are made to the coupling constraint (definition 6') described in the iteration aware scheduling problem above.

$$y_{ar} \in \{0, 1\} \quad \text{Definition 5'}$$
$$a \in \mathcal{A}, r \in \mathcal{R}$$

$$y_{ar} * M \geq \sum_{e \in E} \sum_{t \in \mathcal{T}_r} \sum_{s \in \mathcal{S}_r} x_{earts} \quad \text{Definition 6'}$$
$$a \in \mathcal{A}, r \in \mathcal{R}$$

$$\sum_{r \in \mathcal{R}} y_{ar} \leq L_a \quad \text{Definition 7'}$$
$$a \in \mathcal{A}$$

Team Assignment

This is also the case for the team assignment constraint, with minor changes in definition 9'.

$$y_{pg} \in \{0, 1\} \quad \text{Definition 8'}$$
$$p \in \mathcal{P}, g \in \mathcal{G}$$

$$y_{pg} * M \geq \sum_{e \in E} \sum_{a \in \mathcal{A}} \sum_{r \in \mathcal{R}_g} \sum_{t \in \mathcal{T}_r} \sum_{s \in \mathcal{S}_{ar}} x_{earts} \quad \text{Definition 9'}$$
$$p \in \mathcal{P}, g \in \mathcal{G}$$

$$\sum_{g \in \mathcal{G}} y_{pg} \leq 1 \quad \text{Definition 10'}$$
$$p \in \mathcal{P}$$

Dependencies

The coupling constraint of activity/iteration assignments is updated (definition 12') to adapt both the causal precedence constraints and the earliest start definition.

$$y_{at} \in \{0, 1\} \quad \text{Definition 11'}$$
$$a \in \mathcal{A}, t \in \mathcal{T}$$

$$y_{at} * M \geq \sum_{e \in E} \sum_{r \in \mathcal{R}} \sum_{s \in \mathcal{S}_{ar}} x_{earts} \quad \text{Definition 12'}$$
$$a \in \mathcal{A}, t \in \mathcal{T}$$

$$st_a \in [0, \overline{T}] \quad \text{Definition 13'}$$
$$a \in \mathcal{A}$$

$$st_a \leq y_{at} * ST_t \quad \text{Definition 14'}$$
$$a \in \mathcal{A}, t \in \mathcal{T}$$

$$et_a \in [0, \overline{T}] \quad \text{Definition 15'}$$
$$a \in \mathcal{A}$$

$$et_a \leq y_{at} * ET_t \quad \text{Definition 16'}$$
$$a \in \mathcal{A}, t \in \mathcal{T}$$

$$et_{a_1} + 1 \leq st_{a_2} \quad \text{Definition 17'}$$
$$(a_1, a_2) \in \varepsilon$$

Earliest Start $$st_a \geq EST_a \quad a \in \mathcal{A} \quad \text{Definition 18'}$$

Releases

A similar scheme as for start and end times of activities is introduced in order to incorporate the release characteristics.

Accordingly, a new set of binary decision variables is introduced to indicate that work on a given release is done in an iteration and to derive start and end times (definitions 29' to 34' below).

Constraints are then defined that ensure that the defined earliest start date and the preceding release gaps are respected (definitions 35' and 36' respectively)

$$y_{et} \in \{0, 1\} \quad \text{Definition 29'}$$
$$e \in E, t \in \mathcal{T}$$

$$y_{et} * M \geq \sum_{e \in E} \sum_{r \in \mathcal{R}} \sum_{s \in \mathcal{S}_{ar}} x_{earts} \quad \text{Definition 30''}$$
$$e \in E, t \in \mathcal{T}$$

$$st_e \in [0, \overline{T}] \quad \text{Definition 31'}$$
$$e \in E$$

$$st_e \leq y_{et} * ST_t \quad \text{Definition 32'}$$
$$e \in E, t \in \mathcal{T}$$

$$et_e \in [0, \overline{T}] \quad \text{Definition 33'}$$
$$e \in E$$

$$et_e \leq y_{et} * ET_t \quad \text{Definition 34'}$$
$$e \in E, t \in \mathcal{T}$$

$$st_e \leq ST_e \quad \text{Definition 35'}$$
$$e \in E$$

$$st_e \in et_{e^<} + \delta_e \quad \text{Definition 36'}$$
$$(e^<, e)$$

Release Aware Scheduling Optimization

The hierarchy of objective functions is similar to the hierarchy in the iteration aware scheduling optimization described above. In decreasing importance:
1) Work flow
2) Release date violations
3) Work item (story) value
4) Weighted completion times Work Flow The topmost priority of ensure a structured work flow by minimizing the number of iteration violations remains unchanged:

$$\min \sum_{a \in \mathcal{A}} \sum_{t \in \mathcal{T}} y_{at} \quad \text{Definition 19'}$$

Release Date Violation

Adaptations are made to the model to account for the incorporation of multiple releases.

Initially, the delay indicator function is changed to be release specific, per definition 37' below:

$$Y_{et} = \begin{cases} 1, & \text{if } ET_t > ET_e \\ 0, & \text{otherwise} \end{cases} \quad \text{Definition 37'}$$

Following this the sum of all release date delays is minimized (v referring to iteration violations):

$$\min \sum_{e \in E} x_e^v \quad \text{Definition 38'}$$

$$x_e^v \geq y_{et} * Y_{et} * E_t \quad \text{Definition 39'}$$
$$e \in E, t \in \mathcal{T}$$

$$x_e^v \in [0, \overline{T}] \quad \text{Definition 40'}$$
$$e \in E$$

This is only needed if at least one work item is strictly scheduled. If no work items are strictly scheduled the constraint of definition 41' is added:

$$x^v = 0 \quad \text{Definition 41'}$$

Work Item (Story) Value

The work item objective function does not need any adaptations, so is as per the iteration aware scheduling section above.

$$\max \sum_{p \in \mathcal{P}} y_p * W_p \quad \text{Definition 20'}$$

Weighted Completion Times

The weighted completion times objective also remains the same:

$$\min \sum_{p \in \mathcal{P}} et_p * W_p \quad \text{Definition 21'}$$

$$et_p \geq et_a \quad \text{Definition 22'}$$
$$p \in \mathcal{P}, a \in \mathcal{A}_p$$

$$et_p \in [0, \overline{T}] \quad \text{Definition 23'}$$
$$p \in \mathcal{P}$$

4.2 Release Aware Scheduling Method

This section provides describes a computer implemented method for automatically scheduling project tasks taking releases (as well as the iterations in which teams work) into account. The method is implemented by a computer processing system, one example of which is described below.

The method described in this section extends the iteration aware scheduling method described in section 2.2 above. Accordingly, this section will focus on the differences/additional processing.

To illustrate the release aware scheduling embodiment, Table 4 below provides an example of a table used to capture/store data relating to resources. This is similar to Table 1 of the iteration aware scheduling described above.

TABLE 4

| | | | | Resources | | |
|---|---|---|---|---|---|---|
| Team | Resource | Available | Absent | Weekly Hours In Team | Skills | Team Schedule |
| A | Member A | Always | None | 40 | 1 | Scrum (2 weeks) |
| A | Member B | Always | None | 20 | 1, 2 | |
| B | Member C | Always | None | 32 | 3 | Scrum (3 weeks) |
| B | Member D | Always | None | 40 | 1, 2, 3 | |
| B | Member B | Always | None | 20 | 1, 2 | |
| C | Member D | Always | None | 40 | 1, 2, 3 | Scrum |
| C | Member E | Always | None | 40 | 3 | (2 weeks), Starting sprints on Tuesdays. |

Table 5 below is an example of a table used to capture/store data relating to releases. In this example each release can have a target start date and a target end date and a scheduled (actual) start date and a scheduled (actual) end date. The scheduled start and end dates are calculated by the release aware scheduling method described in this section.

TABLE 5

| | | Releases | | |
|---|---|---|---|---|
| Release Name | Target Start | Target End | Scheduled (Actual) Start | Scheduled (Actual) End |
| R1 | 1 Jan. 2015 | 31 Jan. 2015 | (Calc) | (Calc) |
| R2 | Up to 2 weeks before R1 ends | 28 Feb. 2015 | (Calc) | (Calc) |

Table 6 is an example of a table used to capture/store data relating to work items. Table 6 is similar to table 2 above, however in table 6 includes a release field indicating allowing a user to specify that a particular work item must be included in a particular release (e.g. in table 2 work item A1.1 has been specified for inclusion in release 2.

TABLE 6

| | | | | | | | | | | | | |
|---|---|---|---|---|---|---|---|---|---|---|---|---|
| | | | | | | | | | Work items | | | |
| Work item | Team | Release | Earliest Start | Depends on | Sched start | Sched end | Est (h) | Skill 1 | Skill 2 | Skill 3 | Priority | Project |
| A | | (Calc) | | | (Calc) | (Calc) | 290 | 95 | 45 | 150 | | A |
| A.1 | | (Calc) | | | (Calc) | (Calc) | 290 | 95 | 45 | 150 | | A |
| A.1.1 | Team B | R2 | | | (Calc) | (Calc) | 100 | | | 100 | 1 | A |
| A.1.2 | Team C | (Calc) | | | (Calc) | (Calc) | 40 | 20 | 20 | | 2 | A |
| A.1.3 | (Calc) | (Calc) | | | (Calc) | (Calc) | 50 | 50 | | | 3 | A |
| A.1.4 | (Calc) | (Calc) | | | (Calc) | (Calc) | 100 | 25 | 25 | 50 | 4 | A |

Figure 9:
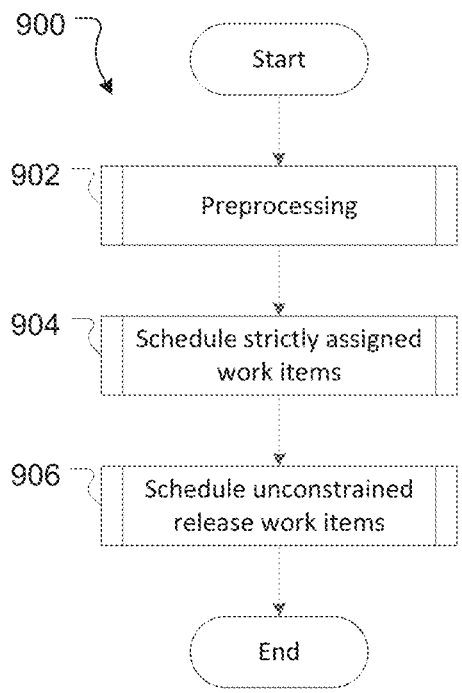
FIG. 9 is a flowchart illustrating high level stages involved in a release (and iteration) aware work item scheduling process.

FIG. 9 provides a flowchart 900 which depicts the high level stages involved scheduling tasks taking into account release (and iterations). Each of the high level stages represented by flowchart 900 will be described in detail following the general description.

At 902, preprocessing is performed. At 904, scheduling of strictly assigned work items is performed. A strictly assigned work item is a work item that is required to be completed in a particular release. In order to schedule strictly assigned work items any causal predecessor work items to the strictly assigned work items also need to be scheduled.

At 906, scheduling of unconstrained release work items is performed. An unconstrained release work item is a work item in the backlog that has not been strictly assigned to a particular release and is not a causal predecessor to a strictly assigned work item.

Once the release aware scheduling process is complete the schedule calculated is presented to a user. The tables described above may be used to present scheduling information to a user by populating the fields calculated by the release aware scheduling method. This is illustrated in table 9 (in which the scheduled/actual start and end dates for the releases are shown) and table 8 (in which the scheduled start dates for the work items are shown), tables 9 and 8 following from the examples provided in tables 4, 5 and 6 above.

TABLE 9

Releases following release aware scheduling process

| Release Name | Target Start | Target End | Scheduled (Actual) Start | Scheduled (Actual) End |
|---|---|---|---|---|
| R1 | 1 Jan. 2015 | 31 Jan. 2015 | 1 Jan. 2015 | 21 Jan. 2015 |
| R2 | Up to 2 weeks before R1 ends | 28 Feb. 2015 | 22 Jan. 2015 | 11 Feb. 2015 |

TABLE 8

Work items following release aware scheduling process

| Work item | Team | Release | Earliest Start | Depends on | Sched start | Sched end | Est (h) | Skill 1 | Skill 2 | Skill 3 | Priority | Project |
|---|---|---|---|---|---|---|---|---|---|---|---|---|
| A | A, B, C | | | | 1 Jan. 2015 | 11 Feb. 2015 | 290 | 95 | 45 | 150 | | A |
| A.1 | A, B, C | | | | 1 Jan. 2015 | 11 Feb. 2015 | 290 | 95 | 45 | 150 | | A |
| A.1.1 | Team B | R2 | | | 22 Jan. 2015 | 11 Feb. 2015 | 100 | | | 100 | 1 | A |
| A.1.2 | Team C | R1 | | | 6 Jan. 2015 | 19 Jan. 2015 | 40 | 20 | 20 | | 2 | A |
| A.1.3 | Team A | R1 | | | 1 Jan. 2015 | 14 Jan. 2015 | 50 | 50 | | | 3 | A |
| A.1.4 | Team B | R1 | | | 1 Jan. 2015 | 21 Jan. 2015 | 100 | 25 | 25 | 50 | 4 | A |

Calculated schedule information may also (or alternatively) be communicated to other processes or applications which may use the scheduling information for downstream purposes.

Preprocessing 902

Figure 10:
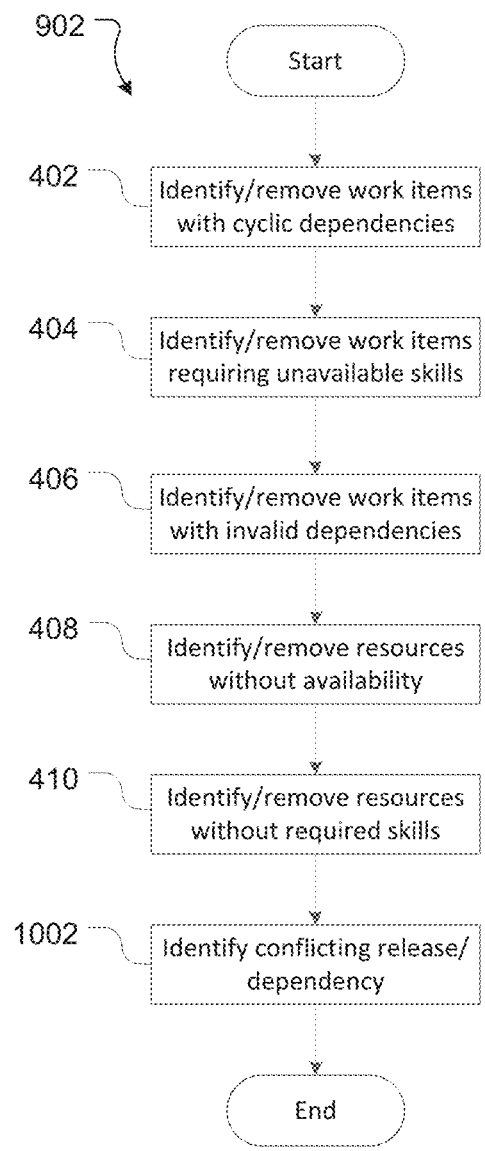
FIG. 10 is a flowchart illustrating preprocessing performed in a release aware work item scheduling process.

Preprocessing 902 for the release aware scheduling is illustrated in FIG. 10. The release aware scheduling preprocessing 902 involves the steps performed in iteration aware scheduling preprocessing 202 described above (i.e. steps 402, 404, 406, 408, and 410 of process 202 described with reference to FIG. 4). These steps will not be described again here.

In addition, preprocessing in the release aware scheduling involves an additional check at 1002 to determine whether any incompatible release assignments/work item dependencies have been defined. This check is performed to account for the possibility of a dependency relationship between work items conflicting with the temporal relationship of the releases to which the work items are strictly assigned.

To provide an example of such a conflict consider: two work items A and B are defined; two releases R1 and R2 are defined; work item B is dependent on work item A (i.e. work item B cannot be started until work item A is completed); work item A is strictly assigned to R2; work item B is strictly assigned to R1; a relative release start date for R2 is defined to be dependent on R1. In this situation the causal predecessor relationship of the work items conflicts with the temporal relationship of the releases: R2 needs to be completed before R1 (in order for work item A to be completed before work item B), but R1 needs to be completed before R2 (in order to comply with the relative release start date of R2).

If a conflict of this type is identified an error message is raised informing a user of the conflict and the work item dependency is ignored during the actual scheduling process.

Scheduling Strictly Assigned Work Items: 904

Figure 11:
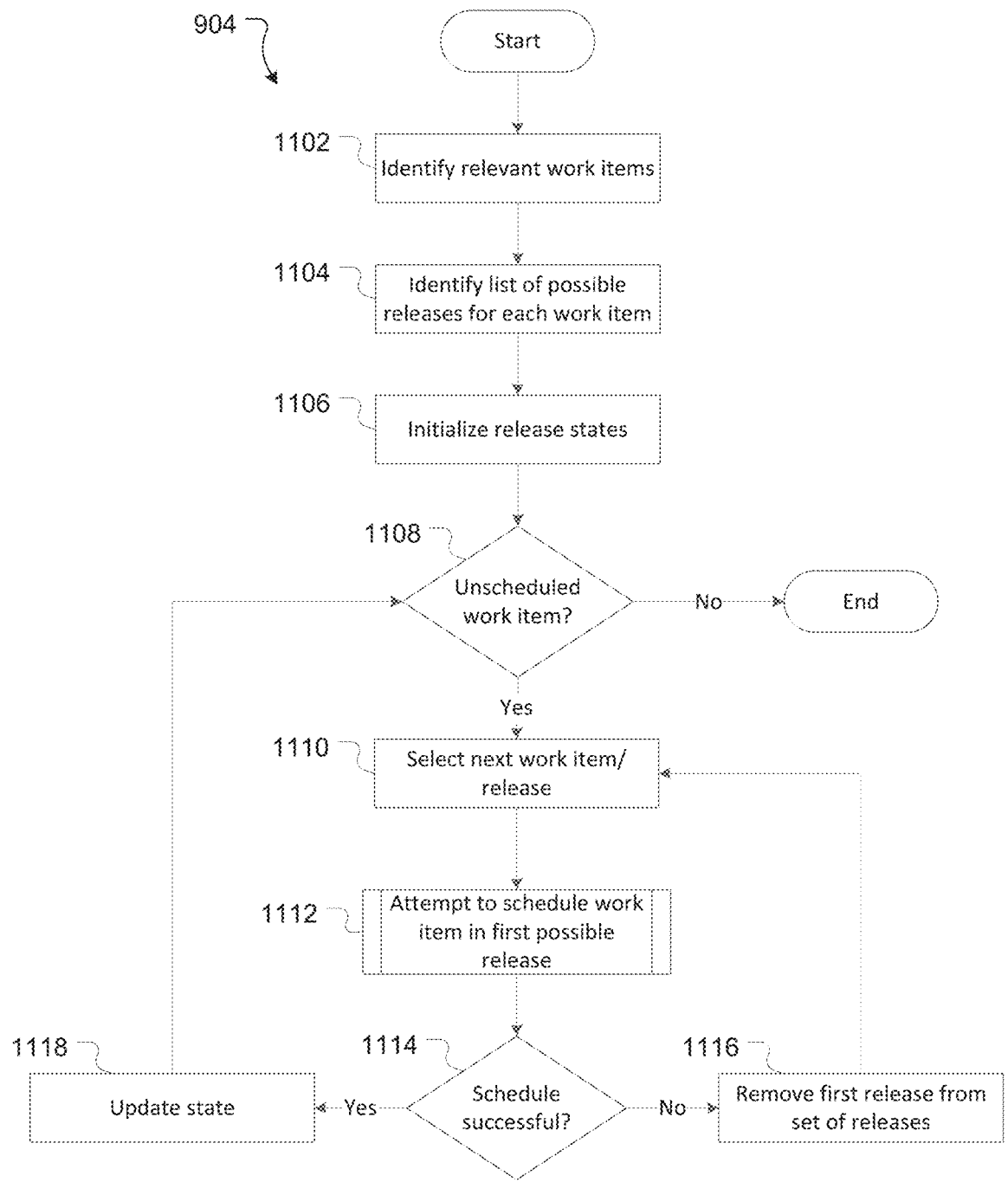
FIG. 11 is a flowchart illustrating a process for scheduling strictly assigned work items into releases.

Following preprocessing at 902, strictly assigned work items are scheduled at 904. This will be described with reference to FIG. 11. As noted, a strictly assigned work item is a work item that must be completed in a particular release.

In order to schedule a strictly assigned work item into a release it is necessary to consider the scheduling of the strictly assigned work item itself (which must be scheduled into the assigned release) as well as any causal predecessors to that strictly assigned work item. A causal predecessor need not be assigned to the same release as its strictly assigned successor(s), however does need to be scheduled (into any available release) to allow the strictly assigned successor(s) to start and end in the release to which it is strictly assigned.

At 1102 a set of work items to be considered in the scheduling of strictly assigned work items phase is generated. This involves identifying both strictly assigned work items and, for each strictly assigned work item identified, any causal predecessor work items to that strictly assigned work item.

At 1104, for each work item in the set of work items generated at 1102 a list of possible releases is identified. Each work item is assigned to a work stream. A work stream is assigned an ordered list of releases (the order typically being a temporal order but not necessarily). The ordering of releases in the stream to which the work item is assigned defines the list of possible releases for that work item. Different streams may relate to any relevant grouping of work, for example different sub-projects, different product lines or other groupings. A given team may work on many different streams, but releases and work items are assigned to one and only one stream.

For a strictly assigned work item the list of possible releases comprises, by definition, a single release (i.e. the release to which the work item is strictly assigned).

For a causal predecessor work item two cases are distinguished based on whether the causal predecessor work item is in the same work stream as all of its dependent strictly assigned work item(s) or if it is in a different work stream to any of its dependent strictly assigned work item(s).

If a causal predecessor work item is in a work stream that is different to all of the work stream(s) its dependent strictly assigned work item(s) is/are in, the list of possible releases for that work item comprises all releases in the causal predecessor work item's work stream.

If a causal predecessor work item's work stream is the same as the work stream of any of its dependent strictly assigned work item(s), the list of possible releases for the work item comprises all releases in that work stream except any releases that are dependent on a release which includes a strictly assigned work item that is dependent on the causal predecessor work item.

To illustrate these two cases, consider: a particular stream with releases [1,2,3,4,5]; a work item A which is strictly assigned to release [3] (and therefor its set of possible releases is [3]); and a work item B which is not strictly assigned. Under these conditions, the set of possible releases for B is [1,2,3,4,5]. If, however, work item A is dependent on work item B, the set of possible releases for B becomes [1,2,3] only (releases 4 and 5 being dependent on release 3 to which work item A is strictly assigned).

At 1106 release states for all the releases in the sets of potential releases identified at 1104 are initialized. If a release has a fixed start date its state is initialized to be 'started'. If a release does not have a fixed start date its state is initialized to "not-started".

At 1108 a check is performed to determine whether any of the work items identified at 1102 have not yet been scheduled. If all work items identified at 1102 have been scheduled sub-process 904 ends.

If, at 1108, there are work items in the set of work items identified at 1102 that have not been scheduled, the next work item to be scheduled is selected at 1110. This involves processing the prioritized backlog of work items identified at 1102. The next work item selected is the first unscheduled work item in the prioritized backlog that has no unscheduled causal predecessor work items and for which the first possible release has a "started" state. Given the preprocessing described above, and the manner in which the set of releases for a work item are identified at 1104, there will initially be at least one valid work hem/release pair to process.

At 1112 an attempt is made to schedule the work item selected at 1110 into the first possible release for that work item. In one embodiment, the processing performed in order to schedule the work item into the release is substantially the same as the work item scheduling process 206 (described above with respect to FIG. 5), with a difference being in the manner in which upper time bounds are used. As described above, when scheduling a work item without taking releases into account the upper bound is initially set (at 502) to be the planning horizon T̂. When scheduling a work item taking releases into account an alternative upper bound may be initialized for the scheduling process.

If the list of possible releases for the work item being scheduled at 1112 has other releases into which the work item can potentially be scheduled the upper time bound for the scheduling process will, if the end date of the first release for the work item is known, be initialized to that end date at 502. This reflects the fact that if the work item cannot be scheduled into the current release it may be possible to schedule it into another of its potential releases.

Alternatively, if the work item being scheduled at 1112 does not have any other potential releases into which it can be scheduled (which will always be the case for a strictly assigned work item) the upper time bound for the scheduling process is initialized at 502 to be the planning horizon T̂. This reflects the situation that the work item must be scheduled into the release in order to comply with a strict work item assignment, and in this case an attempt to schedule the work item into the release is performed even if it results in the end date of the release being delayed.

At 1114 a check is performed to see if the scheduling attempt performed at 1112 was successful.

If no schedule could be identified the first release is removed from the set of releases for the work item at 1116. The process returns to 1110 to select the next work item/release pair.

At 1118, if the scheduling attempt was successful, an attempt to update release states. Release states can be updated if the work item scheduled at 1118 was the last strictly assigned work item for the release into which it was scheduled, and that release has no defined end date. In this case the end date for the release is recorded as the end date of the iteration into which the work item was scheduled at 1118 (that being the date when everything strictly assigned to the release can be delivered). The end date for the release then serves as an upper bound when attempting to schedule other optional work items into that release. Furthermore, if a start time gap has been defined for a dependent release (i.e. a release that is dependent on the release whose end date has been set), the state time for that dependent release is also updated. The start time for the dependent release is calculated by adding the start time gap to the end date of the previous release. In addition, the state of the dependent release is set to "started".

Following 1118 the process returns to 1108 to check whether any other unscheduled work items exist and need to be scheduled.

Scheduling Unconstrained Release Work Items: 906

Figure 12:
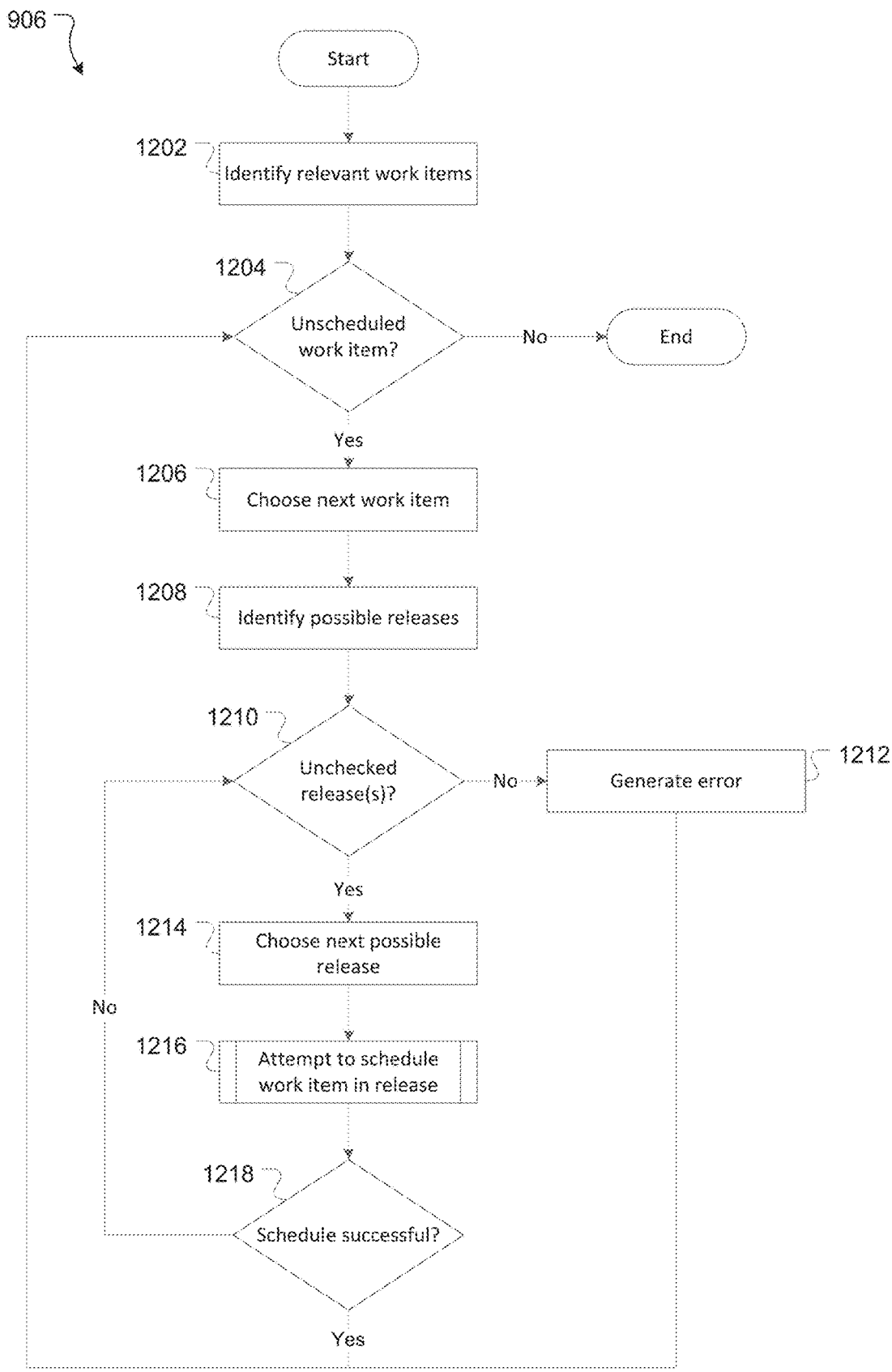
FIG. 12 is a flowchart illustrating a process for scheduling unconstrained release work items into releases.

Once all strictly assigned work items have been scheduled at 904, all of the releases will have start and end dates. Following this, attempts are made to schedule unconstrained release work items from the backlog. A work item in the backlog is an unconstrained work item if it is not strictly assigned and is not a causal predecessor to any strictly assigned work item. The scheduling of unconstrained release work items will be described with reference to FIG. 12.

At 1202 a set of work items to be considered in unconstrained release work item scheduling phase is generated. This involves identifying work items that need to be considered in the phase, which include all unscheduled work items.

At 1204 a check is performed to determine whether any of the work items identified at 1202 have not yet been scheduled. If all work items have been processed sub-process 906 ends.

If, at 1204, there are work items in the set of work items identified at 1202 that have not been scheduled, the next work item is selected at 1206. The next work item selected is the highest priority unscheduled work item without any unscheduled predecessors.

At 1208 possible releases for the work item selected at 1206 are identified based on an earliest viable start time for the work item. The earliest viable start time for the work item is determined to be the latest of the end time(s) of any predecessor work item(s) and any earliest start date for the work item. A release will be a possible release for the work item if it does not end before the earliest viable start time for the work item. Conversely, a release wil not be a possible release for a work item if it ends before the earliest viable start date for the work item.

At 1210 a check is performed to determine if there are possible releases for the work item selected at 1206 that have not been checked. If there are no possible releases, or all possible releases have been checked without a schedule for the work item being identified, an error is generated at 1212 to inform a user that the work item (and any successor work items) cannot be scheduled in the current set of releases. In addition, any successor work items to the work item that cannot be scheduled are removed from the set of work items identified at 1202 to avoid unnecessary processing of those work items. The process then returns to 1204 to check if there are any other unscheduled work items to try and schedule.

If there are possible releases at 1210, the next possible release for the work item is selected at 1214 according to the order of the releases in the work stream.

At 1216 an attempt is made to schedule the work item selected at 1206. In one embodiment, the processing performed in order to schedule a work item is substantially the same as the work item scheduling process 206 described above with respect to FIG. 5, with a difference being that the upper bound of the time interval is initialized at 502 to be the end date of the release selected at 1214.

At 1218 a check is performed to see if the scheduling attempt performed at 1216 was successful. If not, the process returns to 1210 to see if there are further releases to try and schedule the work item into.

If the scheduling attempt was successful, the process returns to 1204 to check if there are any other unscheduled work items to try and schedule.

4.3 Release Aware Scheduling Clauses

Described herein is a computer implemented scheduling method comprising: accessing project data from computer readable storage media, the project data comprising: work item data defining a plurality of work items to be scheduled; release data defining one or more releases into which one or more of the plurality of work items are to be scheduled; processing, using a computer processor, the project data to schedule strictly assigned work items by: identifying strictly assigned work items, a strictly assigned work item having a particular release into which the strictly assigned work item needs to be scheduled; and for each strictly assigned work item identified: scheduling the strictly assigned work item into the release specified for that strictly assigned work item.

On scheduling a strictly assigned work item into the specified release the method may further comprise: determining if all work items strictly assigned to the specified release have been scheduled; and responsive to determining that all work items strictly assigned to the specified release have been scheduled, calculating an end date for the specified release.

Responsive to determining that all work items strictly assigned to the specified release have been scheduled the method may further comprise: identifying a dependent release that is dependent on the specified release for which the end date was calculated; and calculating a start time for the dependent release based on the end date calculated for the specified release.

For each strictly assigned work item identified, processing the project data to schedule the strictly assigned work item may further comprise: identifying any causal predecessor work items to the strictly assigned work item; and scheduling the causal predecessor work items to enable completion of the strictly assigned work item in the particular release associated with the strictly assigned work item.

Scheduling a causal predecessor work item may comprise: identifying a first release into which the causal predecessor work item could potentially be scheduled; attempting to schedule the causal predecessor work item into the first release; responsive to being able to schedule the causal predecessor work item into the first release, scheduling the causal predecessor work item into the first release; and responsive to being unable to schedule the causal predecessor work item into the first release: identifying a second release into which the causal predecessor work item could potentially be scheduled; and attempting to schedule the causal predecessor work item into the second release.

The method may further comprise: processing the project data to identify unconstrained release work items, an unconstrained release work item being a work item that does not need to be scheduled for completion in a particular release; and for each unconstrained release work item identified: attempting to schedule the unconstrained release work item into one of the one or more releases.

Scheduling an unconstrained release work item may comprise: identifying a first release into which the unconstrained release work item could potentially be scheduled; attempting to schedule the unconstrained release work item into the first release; responsive to being able to schedule the unconstrained release work item into the first release, scheduling the unconstrained release work item into the first release; and responsive to being unable to schedule the unconstrained release work item into the first release: identifying a second release into which the unconstrained release work item could potentially be scheduled; and attempting to schedule the unconstrained release work item into the second release.

A release into which an unconstrained release work item can potentially be scheduled may be a release which has an end time which is: after an earliest start date of the unconstrained release work item; and after any end dates of work items on which the unconstrained release work item is dependent.

Also described herein is a system comprising: one or more processors; one or more non-transitory computer-readable storage media storing sequences of instructions which, when executed by the one or more processors, cause the one or more processors to perform the a method as described in the preceding paragraphs.

5. System Architecture

The processes (and features thereof) described above are implemented by one or more computer processing systems. In the system and hardware descriptions below the scheduling functionality will be referred to as being provided by a scheduling module. Generally speaking, the scheduling is a set of computer readable instructions and data which, when executed, cause a computer processing system (or systems) to implement one or more of the features described above.

Various implementations of the scheduling module are possible. For example, in one embodiment the scheduling module is implemented as a plugin (also referred to as an add-in, add on, or extension) which is used to extend the capabilities/functionality of a host application. In one embodiment the host application is Jira, which is commercially available from Atlassian Pty Ltd., Sydney, Australia. Alternatively, the scheduling module may be implemented as a dedicated, stand-alone scheduling program or application. As a further example, the scheduling module may be integrally implemented as part of a broader program or suite of programs.

In one embodiment the scheduling module may be provided using a client server architecture where the scheduling functionality is provided by a server computer and accessed by users from client computers.

Figure 13:
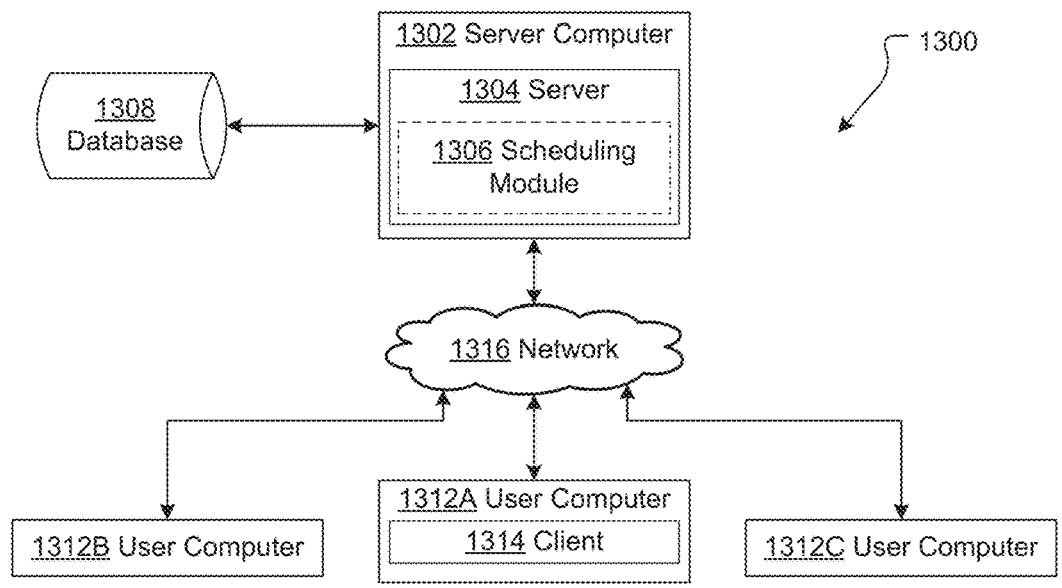
FIG. 13 illustrates a client server architecture.

FIG. 13 illustrates a single server client server system 1300. System 1300 comprises a server computer 1302. Server computer 1302 hosts a server application 1304 for providing server-side functionality. The server application 1304 comprises one or more application programs, libraries, APIs or other software elements that implement the features and functions that are further described herein. The server application 1304 includes, inter alia, a scheduling module 1306 which provides the scheduling functionality described above.

Server computer 1302 also stores or has access to data. In this example data is stored on and managed by a database 1308, though data could be stored in additional or alternative manners, for example on a local file system of the server computer 1302. Database 1308 is provided by a database server which may be provided by server 1302, but will more typically operate on a separate physical computer coupled (directly or indirectly via one or more networks) to server computer 1302.

System 1300 also comprises a user computer 1312. User computer 1312 hosts a client application 1314 which provides client-side functionality.

A client application 1314 may be a general web browser application (such as, for example, Chrome, Safari, Internet Explorer, Opera), in this case the client application 1314 accesses the server 1304 via an appropriate uniform resource locator (URL) and communicates with the server 1304 via general world-wide-web protocols (e.g. http, https, ftp). The web browser application is configured to request, render and display electronic documents that conform to a markup language such as HTML. XML or extensions, and may be capable of internally executing browser-executable code such as JAVASCRIPT, VBScript, or other forms of code. Where the client application 1314 is a web browser, the server application 1304 will be a web server (such as, for example, Apache, IIS, nginx, GWS).

Alternatively, the client application 1314 may be a specific application programmed to communicate with server 1304 using defined application programming interface (API) calls. In this case the server 1304 will be a specific application server configured to interact with the client application.

A user computer 1312 may host more than one ITS client 1314 (for example a general web browser client and a specific application client). Similarly, server computer 1302 may host more than one server application 1314.

The server computer 1302 may serve multiple user computers 1312 (or, more specifically, multiple clients 1314). In FIG. 13 three user computers have been depicted (1312A, 1312B, and 1312C), though more or fewer could be used.

The server computer 1302 and client computer 1312 communicate data between each other either directly or indirectly through one or more communications networks 1316. Communications network 1316 may comprise a local area network (LAN) of an enterprise in one embodiment. In this case system 1300 may be implemented as an on-premises solution in which the server computer 1302 and user computer 1306 are associated with the same business enterprise and at least the server computer 1302 is within an enterprise-controlled facility that is protected from open internetworks using firewalls or other security systems. In another embodiment network 1316 may represent a public internetwork and the server computer 1302 may be located off-premises with respect to an organization, such as in a shared data center or cloud computing facility.

Alternative system implementations/architectures are possible. For example, in certain cases a clustered architecture may be used where multiple server computing instances (or nodes) are instantiated to meet system demand. Conversely, the scheduling functionality described herein may be provided by in stand-alone implementation (i.e. a single computer directly accessed/used by the end user).

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
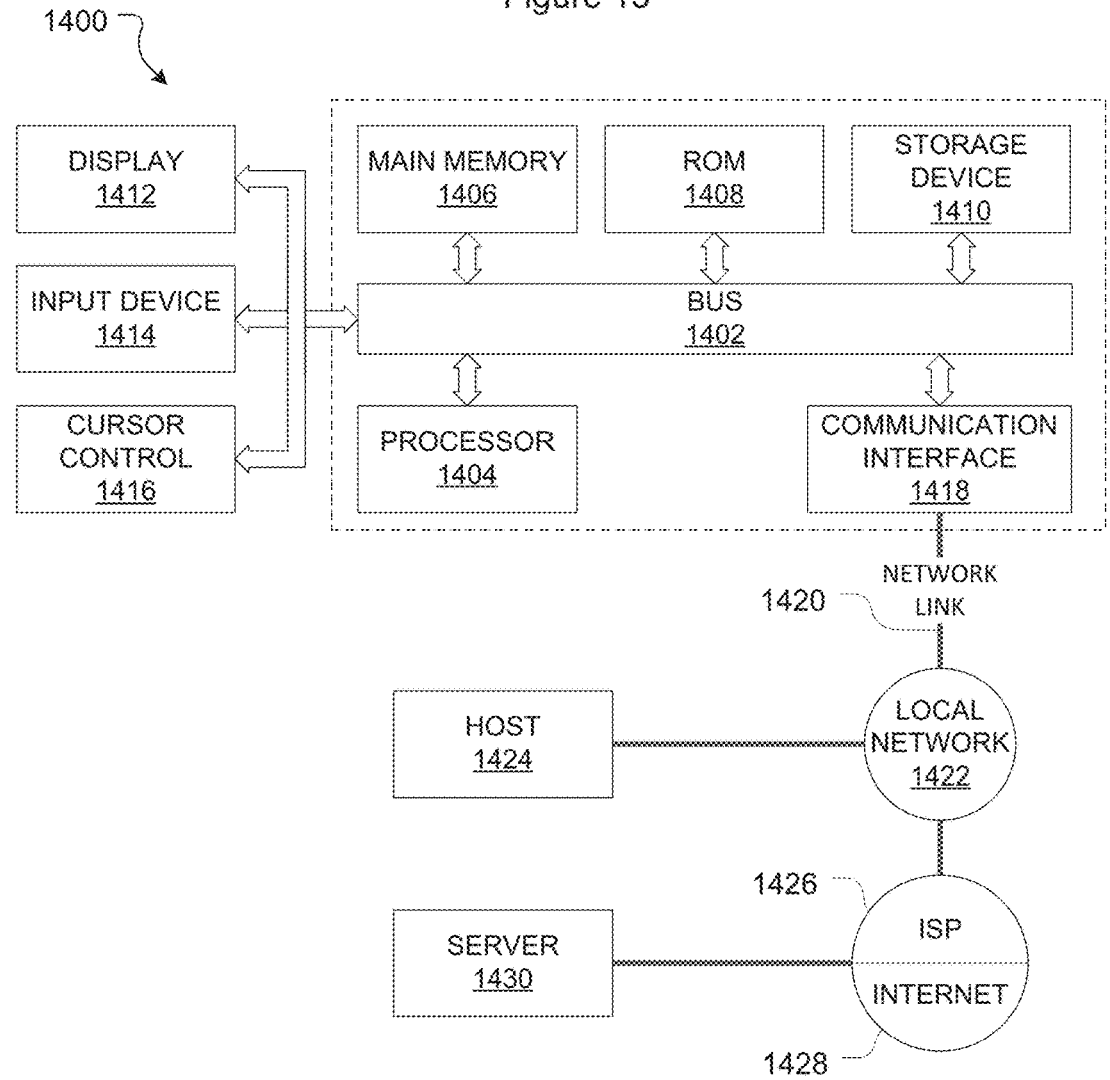
FIG. 14 illustrates a computer system which may be used to implement various embodiments.

For example, FIG. 14 is a block diagram that illustrates a computer system 1400 upon which an embodiment of the invention may be implemented. Server computer 1302 and/or user computer 1312 may be computer systems such as system 1400.

Computer system 1400 includes a bus 1402 or other communication mechanism for communicating information, and a hardware processing unit 1404 coupled with bus 1402 for processing information. The hardware processing unit 1404 may comprise a single computer processing device (e.g. a general purpose microprocessor, a graphics processing unit, or other computational device), or may comprise a plurality of computer processing devices.

Computer system 1400 also includes a main memory 1406, such as a random access memory (RAM) or other dynamic storage device, coupled to bus 1402 for storing information and instructions to be executed by processing unit 1404. Main memory 1406 also may be used for storing temporary variables or other intermediate information during execution of instructions to be executed by processing unit 1404. Such instructions, when stored in non-transitory storage media accessible to processing unit 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processing unit 1404. A storage device 1410, such as a magnetic disk or optical disk, is provided and coupled to bus 1402 for storing information and instructions.

Computer system 1400 may be coupled via bus 1402 to one more output devices such as a display 1412 for displaying information to a computer user. Display 1412 may, for example, be a cathode ray tube (CRT), a liquid crystal display (LCD), a light emitting diode (LED display), or a touch screen display. An input device 1414, including alphanumeric and other keys, may be coupled to bus 1402 for communicating information and command selections to processing unit 1404. Another type of user input device is cursor control 1416, such as a mouse, a trackball, or cursor direction keys for communicating direction information and command selections to processing unit 1404 and for controlling cursor movement on display 1412. This input device typically has two degrees of freedom in two axes, a first axis (e.g., x) and a second axis (e.g., y), that allows the device to specify positions in a plane. Additional and/or alternative input devices are possible, for example touch screen displays.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processing unit 1404 executing one or more sequences of one or more instructions contained in main memory 1406. Such instructions may be read into main memory 1406 from another storage medium, such as storage device 1410. Execution of the sequences of instructions contained in main memory 1406 causes processing unit 1404 to perform the process steps described herein. In alternative embodiments, hard-wired circuitry may be used in place of or in combination with software instructions.

The term 'storage media' as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processing unit 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processing unit 1404 retrieves and executes the instructions. The instructions received by main memory 1406 may optionally be stored on storage device 1410 either before or after execution by processing unit 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processing unit 1404 as it is received, and/or stored in storage device 1410, or other non-volatile storage for later execution.

A computer system as described herein may be configured in a plurality of useful arrangements. In one approach, a data processing method comprises using a server computer, obtaining from one or more non-transitory computer-readable data storage media a copy of one or more sequences of instructions that are stored on the media and which when executed using a particular user computer among a plurality of user computers cause the particular user computer to perform, using the particular user computer alone or in combination with the server computer, the techniques that are described herein; and using the server computer, downloading the copy of the one or more sequences of instructions to any user computer among the plurality of user computers.

In another approach, a computer system comprises a server computer comprising one or more non-transitory computer-readable data storage media stored with one or more sequences of instructions which when executed using a particular user computer among a plurality of user computers cause the particular user computer to perform: using the particular user computer, alone or in combination with the server computer, the techniques that are described herein; and in the server computer, stored downloading instructions which, when executed using the server computer, cause downloading a plurality of copies of the one or more sequences of instructions to the plurality of user computers.

A computer system may take a variety of forms. For example, a client computer 1306 may be a desktop computer, a laptop computer, a notebook computer, a tablet computer, a smart phone, or other computer.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises". "comprised" and the like) are intended to be inclusive and are not intended to exclude further features, components, integers or steps.

A number of flowcharts are provided in order to illustrate processing or functional steps. Although these flowcharts define steps in particular orders to explain various features in some cases the steps may be able to be performed in a different order. Furthermore, in some cases one or more steps may be combined into a single step, a single step may be divided into multiple separate steps, and/or the function(s) achieved by one or more of the described/illustrated steps may be achieved by one or more alternative steps.

It will be understood that the embodiments disclosed and defined in this specification extend to all alternative combinations of two or more of the individual features mentioned or evident from the text or drawings. All of these different combinations constitute various alternative aspects of the embodiments.

What is claimed is:

1. A computer implemented scheduling method comprising:
    accessing project data from computer readable storage media using a computer processor, the project data comprising: work item data defining a plurality of work items to be scheduled; resource data defining a plurality of resources; team data defining a plurality of teams, each team being associated with one or more resources and having a schedule of iterations;
    performing, by the computer processor, preprocessing to reduce processing time and memory usage of the computer implemented method;
    for each work item:
    processing, using the computer processor, the project data to determine one or more team-specific scheduling solutions for the work item, each team specific scheduling solution for the work item defining a particular team, one or more iterations of that particular team in which the work item can be completed, and a number of iteration violations, wherein an iteration violation occurs when an additional iteration needs to be used to complete the work item;
    wherein the processing takes into account a constraint that limits each team of the plurality of teams to utilizing the one or more resources associated with the team as defined by the project data;
    identifying from the one or more team-specific scheduling solutions, using the computer processor, an optimal scheduling solution for the work item, the optimal scheduling solution being selected based at least in part on a least number of iteration violations defined by each of the one or more team-specific scheduling solutions; and
    scheduling the work item using the computer processor according to the optimal scheduling solution identified for the work item.

2. The computer implemented scheduling method according to claim 1, wherein an optimal scheduling solution is determined to be a team-specific scheduling solution defining fewest number of iterations of the one or more team-specific scheduling solutions for the work item.

3. The computer implemented scheduling method according to claim 2, wherein if multiple team-specific scheduling solutions define a same least number of iterations, the optimal scheduling solution is determined to be the team-specific scheduling solution which defines the least number of iterations and an earliest work item completion time.

4. The computer implemented scheduling method according to claim 1, wherein processing the project data to determine one or more team-specific scheduling solutions for a given work item comprises, for each team available to work on the given work item, processing the project data to try and determine a team-specific scheduling solution for the given work item for that team.

5. The computer implemented scheduling method according to claim 4, wherein each work item comprises one or more work item activities, and wherein processing the project data to determine a team-specific scheduling solution in respect of a given work item and a given team comprises:
    processing the project data to determine a final assignment for each activity of the given work item, the team specific scheduling solution for the given work item comprising the final assignments for all activities of the given work item, and wherein
    a final assignment in respect of a particular activity of the given work item defines a sub-team of the given team and one or more iterations in which the sub-team can complete the particular activity of the given work item.

6. The computer implemented scheduling method according to claim 5, wherein determining a final assignment for a given activity of a given work item for a given team comprises:
    generating a queue of solution candidates, each solution candidate defining a sub team of the given team and one or more iterations;
    determining a heuristic solution quality for each solution candidate in the queue of solution candidates;
    selecting a current solution candidate from the queue of solution candidates, the current solution candidate being the solution candidate with a best heuristic solution quality;
    determining whether an assignment for the given activity and current solution candidate exists; and
    responsive to determining that an assignment for the given activity and current solution candidate exists, determining that assignment to be the final assignment for the given activity; or
    responsive to determining that no assignment for the given activity and current solution candidate exists, attempting to determine an assignment for the given activity and a different or updated solution candidate.

7. The computer implemented scheduling method according to claim 6, wherein the heuristic solution quality for a given solution candidate is based on the number of iterations defined by the given solution candidate and an end time of a latest iteration defined by the solution candidate.

8. The computer implemented scheduling method according to claim 1, further comprising processing the project data to identify and remove from further processing work items that cannot be scheduled.

9. The computer implemented scheduling method according to claim 8, wherein the project data further comprises dependency data defining one or more dependency relationships between work items, and wherein identifying and removing work items that cannot be scheduled comprises processing the dependency data to identify and remove work items with cyclic dependencies.

10. The computer implemented scheduling method according to claim 9, wherein identifying and removing work items that cannot be scheduled further comprises identifying and removing work items which are dependent on a work item with a cyclic dependency.

11. The computer implemented scheduling method according to claim 8, wherein the project data further comprises:
work item skill data defining, for a given work item, one or more skills required in order to complete the given work item, and
resource skill data further defines, for a given resource, one or more skills held by the given resource; and wherein
identifying and removing work items that cannot be scheduled comprises processing the project data to identify and remove any work items that require at least one skill that is not held by any resource.

12. The computer implemented scheduling method according to claim 1, further comprising processing the project data to identify and remove from further processing resources that cannot contribute to completion of any work item.

13. The computer implemented scheduling method according to claim 12, wherein the project data further comprises:
work item skill data defining, for a given work item, one or more skills required in order to complete the given work item, and
resource skill data further defines, for a given resource, one or more skills held by the given resource; and wherein
identifying and removing resources that cannot contribute to the completion of any work item comprises processing the project data to identify and remove any resource that does not hold one or more skills required by any work item.

14. A system comprising:
one or more processors;
one or more non-transitory computer-readable storage media storing sequences of instructions which, when executed by the one or more processors, cause the one or more processors to:
access project data from the one or more non-transitory computer-readable storage media using the one or more processors, the project data comprising:
work item data defining a plurality of work items to be scheduled;
resource data defining a plurality of resources;
team data defining a plurality of teams, each team being associated with one or more resources and having a schedule of iterations;
performing preprocessing to reduce processing time and memory usage of the computer implemented method;
for each work item:
process the project data using the one or more processors to determine one or more team-specific scheduling solutions for the work item, each team specific scheduling solution for the work item defining a particular team, one or more iterations of that particular team in which the work item can be completed, and a number of iteration violations, wherein an iteration violation occurs when an additional iteration needs to be used to complete the work item;
wherein the processing takes into account a constraint that limits each team of the plurality of teams to utilizing the one or more resources associated with the team as defined by the project data;
identify from the one or more team-specific scheduling solutions using the one or more processors an optimal scheduling solution for the work item, the optimal scheduling solution being selected based at least in part on a least number of iteration violations defined by each of the one or more team-specific scheduling solutions; and
scheduling the work item using the one or more processors according to the optimal scheduling solution identified for the work item.

15. The system according to claim 14, wherein an optimal scheduling solution is determined to be a team-specific scheduling solution defining a fewest number of iterations of the one or more team-specific scheduling solutions for the work item.

16. The system according to claim 15, wherein if multiple team-specific scheduling solutions define a same least number of iterations, the optimal scheduling solution is determined to be the team-specific scheduling solution which defines the least number of iterations and an earliest work item completion time.

17. The system according to claim 14, wherein processing the project data to determine one or more team-specific scheduling solutions for a given work item comprises:
for each team available to work on the given work item, processing the project data to try and determine a team-specific scheduling solution for the given work item for that team.

18. The system according to claim 17, wherein each work item comprises one or more work item activities, and wherein processing the project data to determine a team-specific scheduling solution in respect of a given work item and a given team comprises:
processing the project data to determine a final assignment for each activity of the given work item, the team specific scheduling solution for the given work item comprising the final assignments for all activities of the given work item, and wherein
a final assignment in respect of a particular activity of the given work item defines a sub-team of the given team and one or more iterations in which the sub-team can complete the particular activity of the given work item.

19. The system according to claim 18, wherein determining a final assignment for a given activity of a given work item for a given team comprises:
generating a queue of solution candidates, each solution candidate defining a sub team of the given team and one or more iterations;

determining a heuristic solution quality for each solution candidate in the queue of solution candidates;

selecting a current solution candidate from the queue of solution candidates, the current solution candidate being the solution candidate with a best heuristic solution quality;

determining whether an assignment for the given activity and current solution candidate exists; and responsive to determining that an assignment for the given activity and current solution candidate exists, determining that assignment to be the final assignment for the given activity; or responsive to determining that no assignment for the given activity and current solution candidate exists, attempting to determine an assignment for the given activity and a different or updated solution candidate.

20. The system according to claim 19, wherein the heuristic solution quality for a given solution candidate is based on the number of iterations defined by the given solution candidate and an end time of a latest iteration defined by the solution candidate.

21. The system according to claim 14, wherein the sequences of instructions, when executed, further cause the one or more processors to process the project data to identify and remove from further processing work items that cannot be scheduled.

22. The system according to claim 21, wherein the project data further comprises dependency data defining one or more dependency relationships between work items, and wherein identifying and removing work items that cannot be scheduled comprises processing the dependency data to identify and remove work items with cyclic dependencies.

23. The system according to claim 22, wherein identifying and removing work items that cannot be scheduled further comprises identifying and removing work items which are dependent on a work item with a cyclic dependency.

24. The system according to claim 21, wherein the project data further comprises:

work item skill data defining, for a given work item, one or more skills required in order to complete the given work item, and resource skill data further defines, for a given resource, one or more skills held by the given resource; and wherein identifying and removing work items that cannot be scheduled comprises processing the project data to identify and remove any work items that require at least one skill that is not held by any resource.

25. The system according to claim 14, wherein the sequences of instructions, when executed, further cause the one or more processors to process the project data to identify and remove from further processing resources that cannot contribute to completion of any work item.

26. The system according to claim 25, wherein the project data further comprises:

work item skill data defining, for a given work item, one or more skills required in order to complete the given work item, and resource skill data further defines, for a given resource, one or more skills held by the given resource; and wherein identifying and removing resources that cannot contribute to the completion of any work item comprises processing the project data to identify and remove any resource that does not hold one or more skills required by any work item.

* * * * *